United States Patent [19]
Dadgar et al.

[11] Patent Number: 5,607,619
[45] Date of Patent: Mar. 4, 1997

[54] INORGANIC PERBROMIDE COMPOSITIONS AND METHODS OF USE THEREOF

[75] Inventors: Ahmad Dadgar; Jonathan N. Howarth; Rodney H. Sergent; Nicolai A. Favstritsky; Julie A. McKeown; Dennis W. Borden; Brent M. Sanders; Jane Likens, all of West Lafayette, Ind.

[73] Assignee: Great Lakes Chemical Corporation, West Lafayette, Ind.

[21] Appl. No.: 479,837

[22] Filed: Jun. 7, 1995

Related U.S. Application Data

[63] Continuation of Ser. No. 922,035, Jul. 29, 1992, abandoned, which is a continuation-in-part of Ser. No. 577,677, Sep. 4, 1990, abandoned, and Ser. No. 732,819, Jul. 19, 1991, abandoned, which is a continuation-in-part of Ser. No. 684,658, Apr. 12, 1991, abandoned, which is a continuation-in-part of Ser. No. 401,036, Aug. 31, 1989, abandoned, which is a continuation-in-part of Ser. No. 164,510, Mar. 7, 1988, abandoned.

[51] Int. Cl.$^6$ .............................. C22B 11/00; C22B 15/00
[52] U.S. Cl. .......................... 252/187.2; 423/22; 423/23; 423/27
[58] Field of Search ................................ 423/22, 23, 27; 205/498, 499, 473, 619

[56] References Cited

U.S. PATENT DOCUMENTS

| 267,723 | 11/1882 | Schaeffer . |
| 267,842 | 11/1882 | DeFiganiere . |
| 411,047 | 9/1889 | MacArthur ............................... 75/102 |

(List continued on next page.)

FOREIGN PATENT DOCUMENTS

| 1195949 | 10/1981 | Canada . |
| 0016290 | 10/1980 | European Pat. Off. . |
| 0168022 | 5/1987 | European Pat. Off. . |
| 0233918 | 9/1987 | European Pat. Off. . |
| 2349664 | 5/1977 | France . |
| 10390 | 6/1958 | Israel . |
| 888537 | 10/1990 | South Africa . |
| 0011817 | of 1887 | United Kingdom . |
| WO85/00384 | 1/1985 | WIPO . |

OTHER PUBLICATIONS

Dadgar et al., J. Phys. Chem., 68, 106 (1964).
Dadgar et al., J. Inorganic Nucl. Chem., 33, 4155 (1971).
Nakagawa et al., J. Phys. Chem., 61, 1007 (1957).
Dubois and Garnier, Bull. Soc. Chim. Fr., 1715 (1965).
Chloropac® product drawings and parts list, Electcatalytic, Inc., Union, N.J. 07083 1990.
Van Velzen et al., HBr Electrolysis in the Ispra Mark 13A Flue Gas Desulphurization Process, J. Applied Electrochemistry, vol. 20, 1990.
A. Dadgar, Refractory Concentrate Gold Leaching: Cyanide vs. Bromine, Journal of the Minerals Metals & Materials Society, Reprinted from JOM, vol. 41, No. 12, Dec. 1989, pp. 37–41.
J. Howarth et al., Electrochemical Regeneration of Bromine In A Gold Leach/Recovery Circuit, EPD Congress '91, TMS Annual Meeting, Feb. 17–21, 1991, New Orleans, LA.

(List continued on next page.)

*Primary Examiner*—Sharon Gibson
*Assistant Examiner*—Valerie Fee
*Attorney, Agent, or Firm*—Woodard, Emhardt, Naughton, Moriarty & McNett

[57] ABSTRACT

A process for leaching gold, silver, platinum and palladium wherein an aqueous leaching solution containing bromine and bromide ion contacts a precious metal source to produce an aqueous leachate. A precursor composition for producing an aqueous leaching solution for leaching gold, silver, platinum and palladium. A process for electrogenerating bromine and a process for leaching gold, silver, platinum and palladium wherein bromine is electrogenerated and contacts a precious metal source to produce an aqueous leachate. A process for leaching gold, silver, platinum and palladium wherein bromine is electrogenerated from a solution containing chloride ions and bromide ions.

43 Claims, 10 Drawing Sheets

U.S. PATENT DOCUMENTS

| | | | |
|---|---|---|---|
| 545,891 | 9/1895 | Hinman | 75/102 |
| 578,721 | 3/1897 | Cassel | 75/102 |
| 578,746 | 3/1897 | Hinman | 75/102 |
| 2,283,198 | 5/1942 | Fink et al. | 75/102 |
| 2,304,823 | 12/1942 | Harrison | 75/118 |
| 2,825,685 | 3/1958 | Schachter et al. | 204/128 |
| 3,058,875 | 10/1962 | Goodenough | 257/187.2 |
| 3,305,472 | 2/1967 | Oldershaw et al. | 204/268 |
| 3,322,276 | 5/1967 | Belohlav et al. | 210/62 |
| 3,495,976 | 2/1970 | Bazilevsky et al. | 75/101 |
| 3,625,674 | 12/1971 | Jacobs | 75/101 |
| 3,709,681 | 1/1973 | Wilson | 75/109 |
| 3,873,438 | 3/1975 | Anderson et al. | 204/268 |
| 3,936,332 | 2/1976 | Matsumoto et al. | 156/18 |
| 3,957,505 | 5/1976 | Homick et al. | 75/108 |
| 3,957,601 | 5/1976 | Drinkard, Jr. et al. | 204/105 |
| 3,960,549 | 6/1976 | MacGregor | 75/108 |
| 4,085,028 | 4/1978 | McCallum | 204/268 |
| 4,188,362 | 2/1980 | Edwards et al. | 423/22 |
| 4,190,489 | 2/1980 | Bahl et al. | 156/664 |
| 4,203,814 | 5/1980 | Grantham | 204/128 |
| 4,251,335 | 2/1981 | Bergner et al. | 204/98 |
| 4,279,712 | 7/1981 | Satoh et al. | 204/128 |
| 4,294,671 | 10/1981 | Balko | 204/128 |
| 4,311,568 | 1/1982 | Balko | 204/128 |
| 4,319,922 | 3/1982 | MacDonald | 75/108 |
| 4,319,923 | 3/1982 | Falanga et al. | 75/108 |
| 4,375,984 | 3/1983 | Bahl et al. | 75/97 |
| 4,397,690 | 8/1983 | Vanderpool et al. | 75/108 |
| 4,439,235 | 3/1984 | Simpson | 75/101 |
| 4,557,759 | 12/1985 | McGrew et al. | 75/118 |
| 4,637,865 | 1/1987 | Sergent et al. | 204/111 |
| 4,668,289 | 5/1987 | Langer et al. | 423/46 |
| 4,684,404 | 8/1987 | Kolocsai | 252/187.2 |
| 4,714,534 | 12/1987 | Fair et al. | 204/269 |
| 4,734,170 | 3/1988 | Oda et al. | 204/98 |
| 4,772,364 | 9/1988 | Dempsey et al. | 204/98 |
| 4,904,358 | 2/1990 | Hess | 75/733 |
| 4,936,910 | 6/1990 | Dadgar et al. | 75/428 |
| 4,997,532 | 3/1991 | Flax | 204/105 |
| 5,039,383 | 8/1991 | Spotnitz et al. | 204/128 |
| B1 4,684,404 | 8/1988 | Kolocsai . | |

OTHER PUBLICATIONS

J. Howarth et al., Some Modern Applications of Bromide Ion Electrolysis, Fifth International Forum on Electrolysis, Fort Lauderdale, Florida, Nov. 10–14, 1991.

A. Dadgar et al., Gold Leaching and Recovery: The Bromide Process, Third International Symposium on Electrochemistry in Mineral and Metal Processing Annual Meeting of the Electrochemical Society, St. Louis, MO, May 17–22, 1992.

INORGANIC PERBROMIDE COMPOSITIONS AND METHODS OF USE THEREOF

This application is a continuation of application Ser. No. 07/922,035, filed Jul. 29, 1992, now abandoned, which is a continuation-in-part of application Ser. No. 732,819, filed Jul. 19, 1991, which is a continuation-in-part of application Ser. No. 684,658, filed Apr. 12, 1991, which is a continuation-in-part of application Ser. No. 401,036, filed Aug. 31, 1989, which is a continuation-in-part of application Ser. No. 164,510, filed Mar. 7, 1988, all now abandoned. Application Ser. No. 922,035 is also a continuation-in-part of application Ser. No. 577,677, filed Sep. 4, 1990, abandoned.

FIELD OF THE INVENTION

This invention relates to compositions containing inorganic perbromides and having desirable physical characteristics such as high bromine levels and low bromine vapor pressures. The invention further relates to the use of such compositions for the recovery of precious metals, including gold, silver, platinum and palladium, from a variety of sources thereof. The invention further relates to a method for the electrolytic production of bromine solutions, and to the use of electrolytically produced bromine solutions in applications including precious metal recovery and water treatment.

DESCRIPTION OF THE PRIOR ART

It is desirable in a number of applications to have a source of bromine in high concentration, but without requiring the handling of liquid bromine or solutions having a substantial bromine vapor pressure. While various bromine compositions have been proposed in the prior art, many of these have had disadvantageous physical properties such as high bromine vapor pressures, high thermodynamic crystallization temperatures or poor freeze/thaw stability.

Bromine solutions have been used for the recovery of certain precious metals. Prior art recovery processes using molecular bromine have been effective, but pure bromine is a corrosive, fuming liquid which generates a suffocating vapor and must be subjected to special handling. Bromine can be dissolved in water to a certain extent, but the resulting solutions exhibit a substantial bromine vapor pressure. Molecular bromine can be generated from the acidification of alkali metal bromates, but by themselves bromates provide only a limited source of molecular bromine, and bromate salt solutions have a high crystallization temperature which makes them inconvenient to use as leaching agents for precious metals.

There are a number of sources of gold, silver and platinum group metals which offer the opportunity for economical recovery. Gold is available from ores and numerous scrap sources, including industrial wastes, gold plated electronic circuit boards, and in alloys with copper, zinc, silver or tin in the karat gold used in jewelry. Silver is available from photographic and x-ray film emulsions, scrap sterling, and numerous industrial sources. Platinum group metals are available from industrial sources such a catalysts. As used herein, "precious metals" refers to the group of metals including gold, silver and the platinum group metals. The platinum group metals include ruthenium, osmium, rhodium, iridium, palladium and platinum.

Platinum is a silvery, white, ductile metal which is insoluble in mineral and organic acids, but soluble in aqua regia. Platinum does not corrode or tarnish, and forms strong complexes with halides (i.e., chloride, bromide, fluoride and iodide). Platinum is found in ores mined throughout the world, but primarily in Canada, South Africa, the former U.S.S.R., and Alaska, and is usually mixed with ores of copper, nickel, etc. Platinum is used as a catalyst (nitric acid, sulfuric acid, and high-octane gasoline production; automobile exhaust gas converters), in laboratory ware, spinnerets for rayon and glass fiber manufacture, jewelry, dentistry, electrical contacts, thermocouples, surgical wire, bushings, electroplating, electric furnace windings, chemical reaction vessels and permanent magnets. Palladium is similarly a silvery, white, ductile metal which does not tarnish in air. It is the least noble (most reactive) of the platinum group, is insoluble in organic acids, but soluble in aqua regia and fused alkalies. Palladium is typically found in ores from Siberia, the Ural Mountains, Ontario and South Africa. Platinum, like palladium, is a good electrical conductor and is used in alloys for electrical relays in switching systems and telecommunication equipment, resistance wires and aircraft spark plugs. Palladium is also used as a catalyst for chemical processes including reforming cracked petroleum fractions and hydrogenation, for metallizing ceramics, as "white gold" in jewelry, in protective coatings, and in hydrogen valves (in hydrogen separation equipment).

Further platinum group metal applications include industrial radiography, catalysts, pen points, electrical contacts, jewelry, coatings and headlight reflectors. There are numerous instances in which it is desirable to recover these metals from an aggregate material. Platinum and palladium are present in various ores, and also are included in aggregate materials comprising, for example, electronic and other metal-containing scraps, catalyst substrates, etc. It is naturally desirable to extract as much of the precious metals as possible from these sources, provided that the method of recovery is cost-effective in terms of the amount of metal recovered and any effect on other recovery processes.

By way of example, it is estimated that approximately one million pounds of palladium catalyst per year, at an estimated palladium value of $7 million, is required for hydrocracking processes in the U.S. Although recovery of the palladium may be accomplished by pyrometallurgy, that recovery process results in the loss of a substantial amount of catalyst substrate. By contrast, it would be desirable to provide a method which allows for a substantial extraction of the palladium with reduced destruction of the substrate. Both palladium and platinum are used as catalysts for a variety of other applications, such as in automotive catalytic converters.

Methods for the recovery of precious metals have taken many forms in the prior art. The conventional leaching of gold ores, for example, with alkaline cyanide solutions has been widely practiced on a commercial scale, but has known disadvantages including slow leaching rates, long contact times, and toxicity associated with the use of cyanide. Other methods have included the use of aqua regia, thiourea and a variety of halogen, halide or halide-bearing compounds.

Derivation of platinum and palladium from ore concentrates has typically occurred by the following commercial process. The ore concentrate is dissolved in aqua regia and the platinum is precipitated by ammonium chloride as ammonium hexachloroplatinate. This precipitate is ignited to form platinum sponge, which is them melted in an oxyhydrogen flame or in an electric furnace. Following removal of the platinum by the foregoing chemical treatment, the palladium is complexed with ammonia, then precipitated by addition of hydrochloric acid. After further purification treatment, ignition yields the palladium metal.

There has remained a need for cost-effective methods and compositions for the recovery of precious metals from a variety of sources for such metals. While prior art approaches have been successful, these methods have typically suffered from one or more disadvantages. The present invention uses inorganic bromine compositions in an advantageous recovery system by which the precious metals are extracted from ore concentrates, electronic scrap, catalyst substrates, etc., in relatively high yield.

In addition to their use in the recovery of precious metals from ores, inorganic bromine compositions have been used as disinfectants, for example, in the disinfection of swimming pools. The noxious character of bromine fumes and the relatively high bromine vapor pressure of conventional aqueous bromine concentrates creates inconvenience and hazard in the treatment of pool water or other water circuits with these concentrates. Organic bromine compounds have also been widely used for such applications, but are generally more expensive than inorganic compositions.

In shipping and handling aqueous bromine compositions for various uses, especially for use in recovery of precious metals from ores at remote mining sites, the susceptibility of these compositions to freezing creates difficulties. Certain bromine compositions lack stability if subjected to a freeze/thaw cycle, and the susceptibility to freezing may also complicate packaging and shipping. Many mining sites are in locations where climate is harsh. Moreover, many known compositions have rather high freezing points, so that freezing is a problem even at relatively moderate temperatures.

In certain instances, electrogeneration of bromine at the site of a precious metal recovery or water treatment operation allows a lower consumption of bromine source material than can be attained in processes in which the bromine solution is prepared strictly by chemical mixing. Additionally, leaching of precious metal with a bromine leaching solution and separation of the precious metal from the leachate produces a depleted bromide solution that can be recycled to the electrogeneration facility for use in producing fresh leaching solution.

SUMMARY OF THE INVENTION

Among the several objects of the present invention, therefore, may be noted the provision of an improved process for the hydrometallurgical recovery of precious metals including gold, silver, platinum and palladium from ores or other sources thereof; in particular, the provision of such a process which provides a substantial source of bromine for dissolution of a metal without requiring the handling of liquid bromine or solutions having a substantial bromine vapor pressure; the provision of such a process which avoids the use of cyanide; the provision of such a process which may be used for recovering metals from various types of ores, including refractory ores; and the provision of such a process which produces a leachate from which gold, silver, platinum or palladium may be readily recovered.

Additional objects of the invention include the provision of compositions useful and effective for the leaching of gold, silver, platinum and palladium from source materials; the provision of such compositions which contain a substantial source of molecular bromine; the provision of such compositions which do not exhibit a high bromine vapor pressure; the provision of such compositions which exhibit low thermodynamic crystallization temperatures so they will not freeze during storage or transport even in harsh climates; the provision of such compositions which exhibit a high degree of freeze/thaw stability; and the provision of such compositions which can be used directly or with water dilution, and which do not require prior activation with acid.

Further objects of the present invention include the provision of compositions that are useful as disinfectants, and in particular for the control of microorganisms in swimming pool water and cooling tower water.

Still further objects of the invention include the provision of an improved process for the electrogeneration of bromine in aqueous solution; the provision of such a process which generates an aqueous bromine solution that may be used for the recovery of precious metals, including gold, silver, platinum, and palladium from sources thereof; the provision of such a process which generates bromine to produce an aqueous bromine solution at relatively low cost; the provision of such a process which may be utilized for regeneration of bromine from depleted solutions of bromide ions derived from hydrometallurgical processes; the provision of such a process which may be used in a processes for recovering gold, silver, platinum, and palladium that may be operated at relatively low cost; the provision of such a process which generates a bromine solution that is effective in water treatment and other applications; the provision of such a process whose operation involves minimal risk of exposure of attendant personnel to bromine toxicity; and, in particular, the provision of such a process which generates an aqueous bromine solution of low bromine vapor pressure that is useful and effective in the recovery of precious metals and the treatment of water.

Briefly, therefore, the invention is directed to a process for producing an aqueous leachate containing platinum or palladium by contacting a source thereof with an aqueous bromine leaching solution to thereby produce the aqueous leachate. The aqueous bromine leaching solution contains between about 0.01% and about 20% by weight equivalent molecular bromine, between about 0.005% and about 20% by weight bromide ion, and between about 0.005% and about 30% by weight total halide ion.

The invention is further directed to a leaching solution adapted for leaching a metal selected from the group consisting of platinum, palladium or mixtures thereof from a source containing metal. The composition has a pH of less than about 4 and contains between about 0.01% and about 1% by weight equivalent molecular bromine, between about 0.01% and about 1% by weight bromide ion, and between about 0.005% and about 15% by weight total halide ion.

The invention is further directed to a process for generating bromine in an aqueous solution containing bromide ion. The process comprises causing an aqueous solution containing bromide ions to flow through an electrogeneration system that comprises paired anode means and cathode means and an inlet and an outlet for the flow of solution. The solution at the inlet of the system has a pH of between about 0 and about 6 and a bromide ion concentration of between about 0.5 and about 8.8 moles per liter. The process further comprises applying a direct electric potential via the anode means and the cathode means to cause an electric current to pass through the flowing solution and to generate bromine at the anode means by electrolytic oxidation of bromide ions. The relationship between the electric current and the throughput of solution through the system is such that between about 4% and about 50% of the bromide in the inlet solution is converted to bromine at the anode means. The pH of the solution discharged from the outlet of the system is between about 0 and about 6.

The invention is further directed to a process for producing an aqueous leachate containing a metal or metals selected from the group consisting of gold, silver, platinum and palladium from a source thereof. The process comprises causing an aqueous solution containing bromide ions to flow through an electrogeneration system that comprises paired anode means and cathode means. The system has an inlet and an outlet for the flow of solution. The process further comprises applying a direct electric potential via the anode means and the cathode means to cause an electric current to pass through the flowing solution in the system and to generate bromine at the anode means by electrolytic oxidation of bromide ions, thereby producing a brominated leaching solution. The relationship between the electric current and the throughput of flowing solution through the system is such that between about 4% and about 50% of the bromide in the inlet solution is converted to bromine at the anode means. The process further comprises contacting the source with brominated leaching solution, thereby causing metal or metals contained in the source to react with the leaching solution producing the aqueous leachate containing metal or metals.

The invention is further directed to a process for producing an aqueous leachate containing gold, silver, platinum or palladium from a source thereof. The process comprises causing an aqueous solution containing between about 0.065 and about 0.25 moles per liter bromide ions and at least about 0.56 moles per liter chloride ions to flow through an electrogeneration system that comprises paired anode means and cathode means. The system has an inlet and an outlet for the flow of solution. The process further comprises applying a direct electric potential via the anode means and the cathode means to cause an electric current to pass through the flowing solution in the system and to generate bromine at the anode means by electrolytic oxidation of bromide ions, thereby producing a brominated leaching solution. The relationship between the electric current and the throughput of flowing solution through the system is such that between about 20% and about 50% of the bromide in the inlet solution is converted to bromine at the anode means. The process further comprises contacting the source with the brominated leaching solution, thereby causing the gold, silver, platinum or palladium contained in the source to react with the leaching solution producing the aqueous leachate containing said gold, silver, platinum or palladium.

Other objects and features will be in part apparent and in part pointed out hereinafter.

BRIEF DESCRIPTION OF THE DRAWINGS

Corresponding reference characters indicate corresponding parts in the several drawings.

DESCRIPTION OF THE PREFERRED EMBODIMENTS

Figure 1:
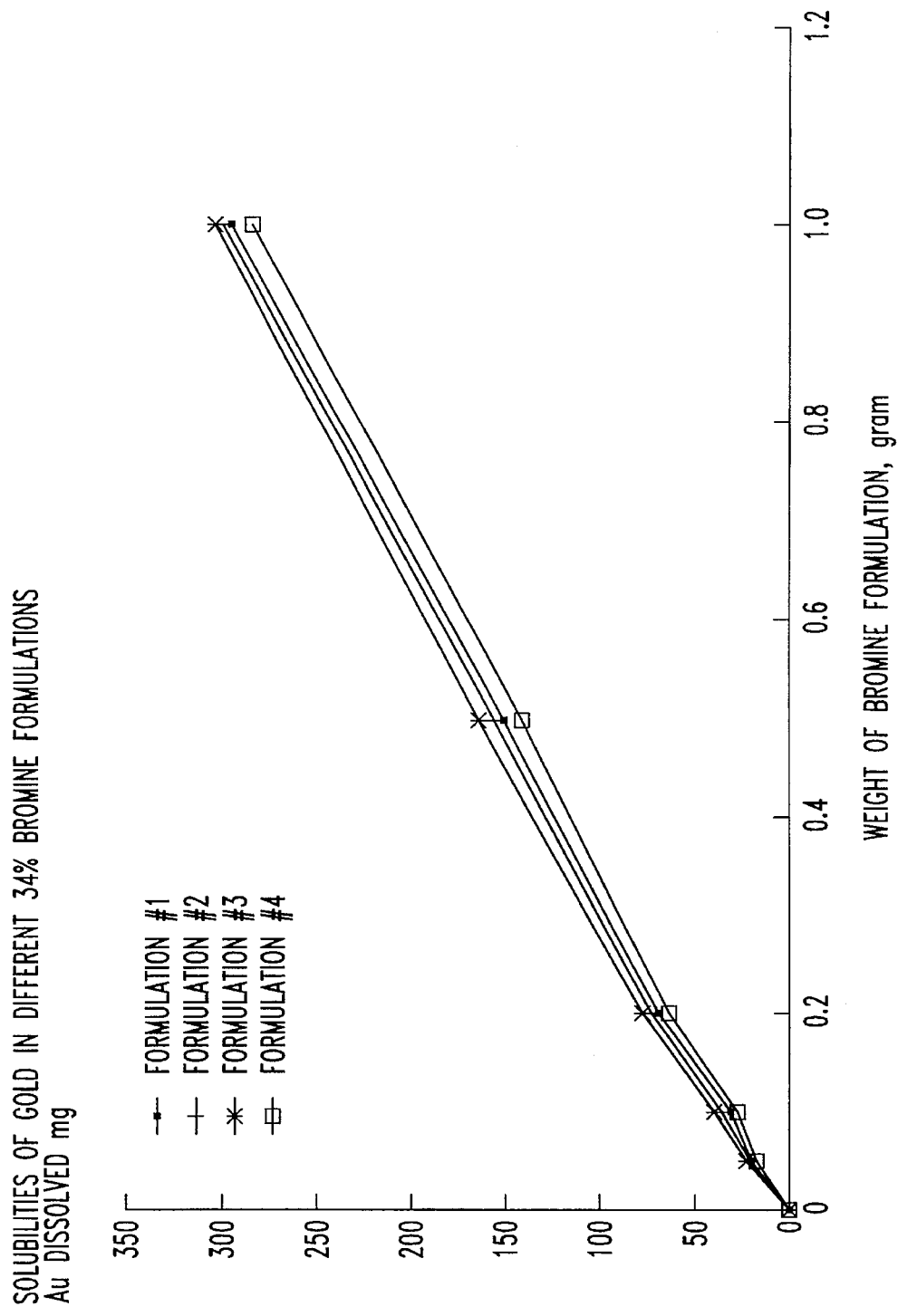
FIG. 1 is a plot of solubility vs. bromine concentration for tests of solubility of gold in the diluted concentrates of Example 5 herein.

In accordance with the invention, inorganic perbromide concentrates have been discovered which may be used advantageously in a variety of applications. In certain methods of use, such as the recovery of gold, silver, platinum, and palladium from ores, these concentrates may be diluted with water to provide aqueous working solutions that are used in practicing the method. In other applications, such as the treatment of swimming pool or cooling tower water, the concentrates may be metered into a circulating stream of the body of water to be treated. Although the concentrates generally contain a substantial percentage of equivalent molecular bromine, they exhibit remarkably low vapor pressures. Moreover, concentrates of high equivalent bromine content exhibit remarkably low vapor pressure not only in those embodiments in which the pH is in the range of 6.5 to 7.5 but also in those concentrates of the invention which are quite acidic (as low as zero or less). These combined properties facilitate handling of the concentrates and avoid the hazards that are normally expected in applications where molecular bromine is used.

A number of the compositions of the invention are advantageously adapted for shipping, storage and/or use in harsh climates. Various of these concentrates exhibit favorable freeze/thaw stability, and certain of them exhibit exceptionally low thermodynamic crystallization temperatures.

The compositions of the invention are inorganic perbromides which have been discovered to exhibit exceptionally low vapor pressures at, alternatively, pH below 1.0 or pH in the range of 6.5 to 7.5. The inorganic perbromide concentrates with acidic pH ranges include a hydrogen halide acid component, while those stable within a pH range of 6.5 to 7.5 include a bromate salt component. The latter concentrates containing bromate may optionally be converted to acidic concentrates by addition of an acid to the concentrate.

Generally, the acidic compositions of the invention are formulated from a metal bromide, a hydrogen halide acid, molecular bromine, and a protic solvent. The protic solvent may be water, alcohol or an organic acid, or a mixture thereof. Compositions of the invention may contain 10–40% by weight equivalent molecular bromine, defined in molar terms as the sum of the actual molar concentration of molecular bromine, the molar concentration of perbromide ion, the molar concentration of hypobromous acid, and the molar concentration of hypobromite ion. Hypobromous acid and hypobromite are produced in the equilibrium reaction:

$$Br_2+H_2O \leftrightharpoons H^++HOBr+Br^- \quad (1)$$

$$HOBr \leftrightharpoons H^++OBr^- \quad (2)$$

In accordance with the invention, it has been found that concentrates containing 25% or more equivalent molecular bromine exhibit remarkably low bromine vapor pressures, excellent freeze/thaw stability, and exceptionally low thermodyamic crystallization temperatures. Advantageously, the molecular bromine concentration of the acidic concentrates is between about 30% and about 36% by weight.

Each of these acidic compositions is prepared by mixing a source of halide ion with molecular bromine in such proportions that the halide ion is in excess. Halide sources generally include both a metal halide salt and a hydrogen halide. Preferably, the halide ion is bromide and the molar ratio of bromide ion to molecular bromine in the formulation is between about 1.2:1 and about 2.0:1, most preferably between about 1.4:1 and about 1.8:1. In solution, the molecular bromine combines with bromide ion to form perbromide or a mixed perhalide ion in accordance with the equations:

$$Br^-+Br_2=Br_3^- \quad (3)$$

or

$$Cl^-+Br_2=ClBr_2^- \quad (4)$$

By control of the ranges of proportions of bromide ion (and other halide ion), complementary countercation, and molecular bromine used in formulating the composition, it has been found that a solution of low vapor pressure can be produced at both high concentrations of equivalent $Br_2$ and very low pH, i.e., zero or below.

Among the metal bromides which can be incorporated in the composition of the invention are alkali metal salts such as sodium bromide, potassium bromide, and lithium bromide, and alkaline earth metal salts such as calcium bromide. Hydrogen halides used in preparing the composition include HCl, HI and preferably, HBr.

Optionally, the acidic concentrates of the invention further contain an alcohol or a low molecular weight organic acid. Alcohols and organic acids have a lower dielectric constant than water. Because the equilibrium constant for the above reactions increases with the reciprocal of the dielectric constant, the inclusion of an organic solvent in the composition also conduces to maintaining a low bromine vapor pressure at a high molecular bromine concentration. Useful organic acids include acetic, propionic, succinic, adipic and the like. Useful alcohols include methanol, butanol, and the like.

It is known that compositions containing alcohol and bromine can be unstable, under certain circumstances explosive, due to reaction of alcohol with bromine. Thus, it is generally preferred that organic solvents other than alcohols be used. However, as explained by Bowman, et al. "A Potential Hazard in Preparing Bromine-Methanol Solutions," *J. Electrochem. Soc.*, Vol. 137, No. 4 (April 1990) 1309–11, $Br_2$/alcohol compositions can be stable, and used safely, if the alcohol content is sufficiently low. Bowman, et al. report that methanol/$Br_2$ compositions are essentially nonreactive, provided that the alcohol content is less than 10% by volume on an alcohol+$Br_2$ basis.

Compositions of the invention which contain hydrobromic acid and an organic protic solvent are generally formulated from:

| | |
|---|---|
| $Br_2$ | 10–40% by wt. |
| Metal bromide | 4–30% by wt. |
| HBr | 5–24% by wt. |
| Organic solvent | 10–40% by wt. |

Water is optionally present as a co-solvent. Preferred compositions are formulated from:

| | |
|---|---|
| $Br_2$ | 20–35% by wt. |
| Metal bromide | 8–16% by wt. |
| HBr | 10–20% by wt. |
| Organic solvent | 15–30% by wt. |

These compositions exhibit a bromine partial vapor pressure not greater than about 40 mm Hg at 25% bromine and 20° C., and a bromine vapor pressure not greater than about 50 mm Hg at 34% bromine and 20° C. Thermodynamic crystallization temperatures are in the range of between about –30° C. to about –50° C. at 34% $Br_2$ for compositions in which water is the solvent, and between about –55° C. and about –68° C. for compositions in which the solvent comprises an organic solvent. The pH is less than 1.0 and generally less than 0.20. Preferred compositions have a pH<0.

Regardless of whether the solvent comprises water, an organic acid, or a mixture thereof, it is especially preferred that the $Br_2$ concentration be greater than 25%. Such compositions are formulated from:

| | |
|---|---|
| $Br_2$ | ≧25% by wt. |
| HBr | 4–20% by wt. |
| Metal bromide | 4–15% by wt. |
| $[Br^-]/[Br_2]$ | 1.2–2.0 (molar ratio) |
| Protic solvent | balance |

The pH is <0. More preferably, such compositions are formulated from:

| | |
|---|---|
| $Br_2$ | 25–35% by wt. |
| HBr | 10–20% by wt. |
| Metal bromide | 10–15% by wt. |
| $[Br^-]/[Br_2]$ | 1.4–1.8 (molar ratio) |
| Protic solvent | balance |

Again, the pH is <1.0. Advantageously, such formulations may contain ≧30%, optimally 32–36% $Br_2$, and a molar excess of bromide over bromine of ≧30%.

Similar compositions in which HCl is substituted for HBr are preferably formulated from:

| | |
|---|---|
| Br$_2$ | ≧25% by wt. |
| HCl | ≧4% by wt. |
| Metal bromide | 10–15% by wt. |
| [H$_2$O]/[NaBr] | ≧4.0 (wt. ratio) | and have a pH <0.

In the NaBr$_3$ compositions, it is particularly preferred that the sodium ion content of the formulation be in the range of between about 1% and about 3% by weight, and that the molar ratio of Na$^+$ to equivalent Br$_2$ be no greater than about 0.8. It has been found that such relatively low proportions of Na$^+$ conduce to a relatively low thermodynamic crystallization temperature, and to excellent freeze/thaw stability of the concentrate. A preferred formulation for a freeze/thaw stable NaBr$_3$ concentrate is:

| | |
|---|---|
| NaBr | 5–15% |
| HBr | 15–30% |
| Br$_2$ | 25–35% |
| H$_2$O | balance |

An especially preferred low Na$^+$ acidic composition comprises:

| | |
|---|---|
| NaBr | 5–10% |
| HBr | 17–27% |
| Br$_2$ | 30–35% |
| H$_2$O | balance |

Calcium bromide compositions exhibit exceptionally low vapor pressure at high equivalent molecular bromine concentrations and low pH. This is believed to be attributable to the greater ionic strength of calcium bromide as compared to alkali metal bromides. Greater ionic strength tends to increase the equilibrium constant for the reactions:

$$Br^- + Br_2 = Br_3^-  \quad (3)$$

or $$Cl^- + Br_2 = ClBr_2^-  \quad (4)$$

At an equivalent molecular bromine concentration of 25%, the Ca(Br$_3$)$_2$ acidic concentrates have a bromine partial vapor pressure of less than about 40 mm Hg at 20° C., while at 34% equivalent molecular bromine, they have a bromine partial vapor pressure of less than about 50 mm Hg at such temperature. Additionally, calcium perbromide compositions provide especially low thermodynamic crystallization temperatures (TCTs), e.g., in the range of between about −50° C. and about −60° C. where water only is the solvent, and below −60° C. where the solvent comprises an organic solvent. Such TCTs are also believed to be attributable to the greater ionic strength of these formulations as compared to alkali metal perbromides. Calcium perbromide compositions preferably are formulated from:

| | |
|---|---|
| Br$_2$ | ≧25% by wt. |
| CaBr$_2$ | ≧5% by wt. |
| HBr | ≧10% by wt. |
| [Br$^-$]/[Br$_2$] | 1.4–1.8 (molar ratio) | and have a pH <1.0

The acidic concentrates described above are preferably prepared by adding the bromide or other halide salt and hydrogen halide to a protic solvent, and then adding liquid bromine to the acidic bromide salt solution. This sequence insures the presence of an excess of bromide ion for reaction with the liquid bromine to form perbromide or XBr$_2^-$ ion (where X is halide) during bromine addition. Advantageously, saturated or nearly saturated premix solutions are prepared for both the bromide salt and hydrogen halide, and these premix solutions are added to water to produce a precursor solution to which the liquid bromine is added. Thus, for example, a solution containing an organic protic solvent may be prepared by mixing in the following sequence:

| | |
|---|---|
| 10 to 40 wt. % | organic solvent |
| 8 to 45 wt. % | 46% by weight NaBr solution |
| 10 to 50 wt. % | 48% by weight HBr solution |
| 10 to 40 wt. % | liquid bromine |
| | or |
| 10 to 40 wt. % | organic solvent |
| 8 to 40 wt. % | 52% by weight CaBr$_2$ solution |
| 10 to 50 wt. % | 48% by weight HBr solution |
| 10 to 40 wt. % | liquid bromine |
| | or |
| 10 to 40 wt. % | organic solvent |
| 10 to 50 wt. % | 38% by weight KBr solution; |
| 10 to 50 wt. % | 48% by weight HBr solution |
| 10 to 40 wt. % | liquid bromine |
| | or |
| 10 to 40 wt. % | organic solvent |
| 7 to 35 wt. % | 54% by weight LiBr solution |
| 10 to 50 wt. % | 48% by weight HBr solution |
| 10 to 40 wt. % | liquid bromine |

Where water alone is the solvent, an NaBr$_3$ concentrate is preferably prepared by mixing:

| | |
|---|---|
| 6 to 40 wt. % | water |
| 9 to 35 wt. % | 46% by weight NaBr solution |
| 10 to 50 wt. % | 48% by weight HBr solution |
| ≧25% by wt. | liquid bromine |

Further included in the compositions of the invention are hydrogen perbromide concentrates formulated from:

| | |
|---|---|
| Br$_2$ | ≧15% by wt. |
| HBr | 15–40% by wt. |
| Organic solvent | 40–60% by wt. |

Where water alone is the solvent, the composition preferably contains:

| | |
|---|---|
| Br$_2$ | ≧25% by wt. |
| HBr | 30–40% by wt. |

At a bromine concentration of 25% and a temperature of 20° C., these HBr$_3$ compositions exhibit a bromine partial vapor pressure of less than about 40 mm Hg.

It should be noted that the compositions of the acidic concentrates of the invention, as outlined above are formulations, i.e., summaries of the components from which the concentrates are formed in the relative proportions used in forming the concentrates. As indicated, these formulations equilibrate to convert Br$_2$ and Br$^-$ to Br$_3^-$. Additionally, some of the Br$_2$ reacts with water to produce hypobromous acid, which in turn dissociates to a limited degree:

$$Br_2 + H_2O \rightleftharpoons H^+ + HOBr + Br^- \tag{1}$$

$$HOBr \rightleftharpoons H^+ + OBr^- \tag{2}$$

Based on known equilibrium constants, the exact equilibrium composition of each of the formulations can be computed. This invention encompasses such equilibrated compositions, however produced. However, for purposes of clarity and simplicity, certain of the concentrates are defined in terms of their formulation from water, bromide salt, hydrogen halide and liquid bromine in the manner described above.

In a further and distinct embodiment of the invention, inorganic perbromide concentrates have been discovered which have a relatively high pH (about 6.5 to about 7.5), and include a bromate ion component. These compositions (hereinafter "alkaline") may be prepared by mixing a perbromide salt component solution and a bromate component solution. The concentrates of this embodiment of the invention are particularly suited for dilution with water to produce a leaching solution for recovery of gold, silver, platinum, and palladium. The remarkably low vapor pressure of the alkaline concentrates facilitates their handling and minimizes hazards of using molecular bromine for such purposes. In particular, dilution of the alkaline concentrate to produce the leaching solution can be carried out without any serious problem of containment of bromine vapor.

Use and handling of the alkaline concentrate are not hampered by bromate salts crystallizing or otherwise precipitating from the solution. The leaching solution prepared from this concentrate has been demonstrated to be highly effective for the leaching of gold from refractory ores, without the need for any preparatory processing other than conventional roasting. If preferred, however, a clean ore concentrate can be prepared by conventional processing, which may include pressure oxidation.

In accordance with a particularly preferred embodiment of the invention, a leaching solution precursor concentrate containing perbromide and bromate salts is initially produced. In the preparation of the leaching solution of the invention, this concentrate is diluted to provide the leaching solution. If desired, the pH may be adjusted either before or after dilution by addition of an acid such as HBr, HCl, $H_2SO_4$, or $Cl_2$, or a base, such as NaOH, KOH or $Ca(OH)_2$.

In the preparation of the alkaline concentrates of the invention, a component solution of an alkali metal or alkaline earth metal perbromide is mixed with a component solution of alkali metal or alkaline earth metal bromate. The perbromide solution is prepared by addition of bromine to an aqueous solution of a bromide ion as discussed above regarding the preparation of the acidic perbromide concentrates. For example, sodium perbromide and calcium perbromide are prepared by saturating the $Br^-$ content of the respective aqueous NaBr or $CaBr_2$ solution with molecular bromine:

$$NaBr + Br_2 \rightleftharpoons NaBr_3 \tag{5}$$

$$CaBr_2 + 2Br_2 \rightleftharpoons Ca(Br_3)_2 \tag{6}$$

When prepared in the course of providing this composition, the metal bromide solution initially has a concentration of at least about 25% by weight, preferably essentially saturated to its solubility limit, i.e., 45–50% by weight in the case of NaBr, or 55–60% by weight in the case of $CaBr_2$. Whatever the initial concentration of the metal bromide solution, liquid or vapor $Br_2$ is added to the solution to the extent of saturating the bromide ion therein, i.e. in full stoichiometric equivalence with the $Br^-$ content. Where the $Br_2$ is added to a NaBr solution that is initially at its solubility limit, the amount of bromine introduced, as may be determined by iodometric titration, is equivalent to a weight concentration in the resulting perbromide solution of about 40–50% $Br_2$. Because of the reversibility of the reactions of equation 3 (as reflected in equations 5 and 6), a portion of the bromine is present as $Br_2$, but most is present as $Br_3^-$. In a solution saturated with respect to both initial NaBr solubility and bromination of $Br^-$ ion, the equilibrium is such that the solution contains about 63–64% by weight $NaBr_3$, 4 to 4.5% $Br_2$ and 2.5 to 3% NaBr.

The alkali metal or alkaline earth metal bromate component solution is prepared by addition of liquid bromine or bromine vapor to an aqueous solution of metal hydroxide, most preferably an alkali metal hydroxide. Hydroxyl ions and molecular bromine react in accordance with the following equation to produce both bromate and bromide ions:

$$3Br_2 + 6OH^- \rightarrow 5Br^- + BrO_3^- + 3H_2O \tag{7}$$

Under alkaline conditions, this reaction proceeds essentially quantitatively to the right. Preferably, the strength of the initial caustic (or other alkaline) solution and the amount of molecular bromine added thereto are controlled so that, when the bromate solution is mixed with the solution of alkali metal or alkaline earth metal perbromide in predetermined relative proportions, the resulting mixture has a pH of between about 6.5 and about 7.5. Where the bromate solution is used in the preparation of a concentrate, the strength of the initial caustic solution and the degree of bromination are selected so that the bromate solution contains at least about 15% by weight equivalent molecular bromine, i.e., at least about 4% by weight bromate ion. Preferably, the bromate solution component of the concentrate contains between about 5% and about 8% by weight bromate ion, roughly equivalent to between about 20% and about 30% by weight molecular bromine. To provide a bromate component solution having such concentration of equivalent molecular bromine and satisfying the stoichiometric requirement set forth by equation 7 the initial concentration of the caustic solution is preferably in the range of 10–20% by weight in the case of sodium hydroxide. Equivalent molar proportions may be computed for other alkalis.

Alternatively, the bromate component solution may be prepared by dissolving an alkali metal bromate or alkaline earth metal bromate salt in water. This in fact is the preferred method for preparing a component solution comprising an alkaline earth metal bromate, since difficulty may be encountered in the preparation of such solution by addition of molecular bromine to a lime or magnesia solution or slurry. In this alternative method of preparing the component solution, an alkali metal or alkaline earth metal bromide is also incorporated so as to produce an overall composition essentially equivalent to that obtained by dissolving $Br_2$ in a caustic solution.

In the preparation of the alkaline concentrate of the invention, the perbromide solution and bromate solution are mixed in proportions of between about 4 parts by weight perbromide solution per part by weight bromate solution and about 4 parts by weight bromate solution per part by weight perbromide solution. Preferably, approximately equal portions of the two component solutions are mixed. Whatever relative proportions are used, the pH of the resultant composition should be between about 6.5 and about 7.5, and the ratio of the molar concentration of bromate ion to the sum of the molar concentrations of molecular bromine and perbromide ion in the composition is between about 0.05 and about 0.8. Where the bromide ion has been fully saturated with bromine in the preparation of the perbromide component solution, the molar concentration of bromide ion in the alkaline concentrate of the invention is equal to the sum of the molar concentration of molecular bromine and five times the molar concentration of bromate ion.

In the alkaline concentrate of the invention, which includes bromate, the bromate ion concentration is at least about 2%, typically ranging from about 2% to about 6% by weight, the equivalent perbromide content is preferably at least about 10%, ranging from about 55% to about 10% by weight, and the concentration of bromide ion (as computed on the basis of no dissociation of perbromide ion) generally ranges from about 3% to about 19%, the preferred compositions thereof typically containing bromide ion weight concentrations in the range of about 6% to about 17%.

The equivalent molecular bromine content of the concentrate is between about 10% and about 40%, preferably between about 20% and about 40%, by weight. More preferably, the equivalent $Br_2$ content is at least about 25% by weight. By using the highly concentrated component solutions as described above, a concentrate can be prepared containing 34% by weight or more equivalent molecular bromine.

At the desired pH of between about 6.5 and about 7.5, the molecular bromine content of the concentrate is generally not converted to bromate and bromide, i.e., equation 7 does not proceed appreciably to the right. As a consequence, there is a stable equilibrium between perbromide ion and $Br_2$, and the composition of the concentrate is stable within the ranges discussed above.

Despite the very high proportions of equivalent molecular bromine, including significant fractions of $Br_2$ and $Br^-_3$, it has been discovered that the vapor pressure of this alkaline variation of the composition of the invention is quite low. For example, a concentrate containing about 34% by weight equivalent bromine exhibits a total vapor pressure of only 23 mm Hg at 0° C., and a total vapor pressure of only 112.5 mm Hg at 35° C. By comparison, the vapor pressures of liquid bromine are 75 mm Hg at 0° C. and 357.5 mm Hg at 35° C., and the vapor pressures of sodium perbromide are 44 mm Hg at 0° C. and 214 mm Hg at 35° C.

Effective aqueous bromine leaching solutions for recovery of precious metals may be prepared by dilution of the alkaline or acidic concentrate of the invention. Prior to or after dilution, the pH may be adjusted by addition of an acid such as $H_2SO_4$, HBr, HCl, or $Cl_2$, or a base, such as NaOH or KOH. Where the concentrate is acidified, HBr is preferred over HCl for most applications. $H_2SO_4$, however, is the preferred acid for use in connection with palladium and platinum recovery. The leaching solution is effective over a wide range of pH, but operation is preferably carried out at a pH of less than about 6. For gold and silver, it is preferred that leaching occur at a pH between about 0 and 6 and more preferably between about 0 and about 4. For platinum and palladium, it is preferred that leaching occur at a pH of less than about 4, more preferably less than about 1, most preferably less than about 0. In all cases, an acidic pH is generally preferred to promote the conversion of bromate ion to molecular bromine. Compositions used for dissolution of Pd and/or Pt preferably contain between about 1 and about 8 equivalents acid per liter of solution. Sulfuric acid is preferred. Where sulfuric acid is the acid used to provide the desired acidity, it is preferably present in a proportion of between about 5% and about 40% by weight, more preferably between about 5% and about 30% by weight, most preferably between about 10% and about 20% by weight.

Where a bromate/bromide concentrate of alkaline or neutral pH is used, acidification is preferably carried out prior to dilution, thus producing an acidic concentrate having a pH of less than about 2.5, preferably between about 0.25 and about 2.5 in the case of gold, and an equivalent molecular bromine concentration in the range of between about 28% and about 40% by weight.

In conjunction with dilution, a portion of NaBr or other halide salt may be advantageously incorporated into the solution. The rate of dissolution of certain metals in the leaching solution is in some instances accelerated if the solution contains halide ions in a concentration that is even higher than that provided by a bromine saturated concentrate, in which instance, preparation of the leaching solution preferably involves incorporation of chloride salt or bromide salt from a source other than the concentrate. It may be noted that both the actual molecular bromine and the ultimate bromide ion content are also affected by the shifts in equilibria which accompany the acidification and dilution process. Thus, equations 3, 5 and 6, supra, are driven to the left, converting perbromide ion to bromide and molecular bromine; equation 7 is also driven to the left, converting bromate ion and bromide ion to molecular bromine. Dilution tends to drive equation 1 to the right, resulting in conversion of molecular bromine to bromide ion and hypobromous acid. As a net result, the hypobromous acid concentration is a significant component of the equivalent molecular bromine content of the leaching solution.

It may further be noted that Eh/pH diagrams constructed from thermodynamic data show progressively larger solubility field at lower Eh values for the formation of the $AuBr_4^-$ complex ion (see equations 8–13 infra) as $Br^-$ ion concentration increases from $10^{-5}$ to 1.0M. These observations are consistent with the requirement for multiple $Br^-$ ions to form the complex anions $AuBr_4^-$, $PdBr_4^{2-}$, $PdBr_6^{2-}$, and $PtBr_6^{2-}$. It may be noted that, where the dilution ratio is modest, for example, 15:1 or less, the acidic or alkaline concentrate of the invention typically furnishes sufficient $Br^-$ ion to fully satisfy the requirement for co-ordinating the metal. At higher ratios of dilution, addition of supplementary bromide salt may be needed. Stoichiometrically, the proportion of $Br^-$, the $Br^-$/metal ratio, and the $Br^{-/Br}_2$ are greater for Pd and Pt than for Au, but as a practical matter, dilutions may more often be appropriate in preparing leaching solutions for gold sources such as low grade ores, in which instance the addition of supplementary bromide salt may be necessary.

Where a precursor concentrate or leaching solution is acidified by addition of $Cl_2$, not only the bromate but the bromide ion content thereof are converted to molecular bromine. This may further enhance the oxidizing and complexing power of the leaching solution for leaching of gold, silver, platinum, and palladium from a source material.

Water, and optionally the halide salt, are mixed with the concentrate in such relative amounts that the equivalent molecular bromine content of the leaching solution is between about 0.01% and about 20% by weight equivalent molecular bromine, between about 0.005% and about 20% by weight bromide ion, and between about 0.005% and about 30% by weight total halide ion. Where low grade sources, such as typical low grade ores are leached, the solution preferably contains between about 0.01% and about 1% by weight, more preferably about 0.02% to about 0.5% by weight, equivalent molecular bromine, between about 0.005% and about 10%, more preferably about 0.01% to about 1%, by weight bromide ion, and between about 0.005% and about 15%, preferably about 0.01% to about 1.5%, by weight total halide ion. However, in certain applications such as, for example, recovery of metallic gold from an electronic circuit board or jewelry scrap, recovery of Pd from spent catalyst, or recovery of Pt/Pd from high grade concentrates, a more concentrated leaching solution may be used to advantage. Such may be prepared from the above described concentrates by modest dilution with water. For example, a 0.5% Pd on alumina catalyst, or a concentrate containing 30–50 oz. Pd per ton, may advantageously be leached with a solution prepared by diluting a $Br_2$ concentrate of the invention to an equivalent molecular bromine content of between about 8 and about 25 gpl, a $Br^-$ content of between about 5 and about 20 gpl, and a total halide content of between about 10 and about 40 gpl.

Gold, silver, platinum, and palladium are recovered from a source thereof, such as comminuted gold ore, by contacting the source material with the aqueous bromine leaching solution. In the case of gold, oxidation and complexing of the gold is believed to proceed in accordance with the equations:

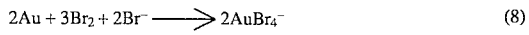

$$2Au + 3Br_2 + 2Br^- \longrightarrow 2AuBr_4^- \quad (8)$$

or

$$2Au + 3HOBr + 5Br^- \xrightarrow{H^+} 2AuBr_4^- + 3H_2O \quad (9)$$

In the case of platinum, oxidation and complexing of the platinum is believed to proceed in accordance with the equations:

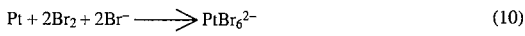

$$Pt + 2Br_2 + 2Br^- \longrightarrow PtBr_6^{2-} \quad (10)$$

or

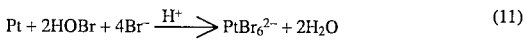

$$Pt + 2HOBr + 4Br^- \xrightarrow{H^+} PtBr_6^{2-} + 2H_2O \quad (11)$$

In the case of palladium, oxidation and complexing of the palladium is believed to proceed in accordance with the equations:

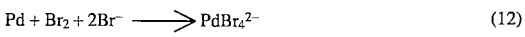

$$Pd + Br_2 + 2Br^- \longrightarrow PdBr_4^{2-} \quad (12)$$

or

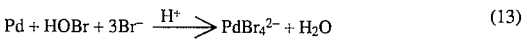

$$Pd + HOBr + 3Br^- \xrightarrow{H^+} PdBr_4^{2-} + H_2O \quad (13)$$

Depending on the nature of the ore, the relative proportions of ore (or other source material) and leaching agent may be such that the leaching slurry contains between about 1 and about 600 lbs. active agent per ton of source. Active agent in this instance is defined as the sum of the amounts of bromide, perbromide, metal hypobromite, hypobromous acid, and molecular bromine in the leaching solution. For recovery of Au from low grade ore, the leaching solution is preferably mixed with the ore to produce a slurry containing between about 5 and about 15 pounds $Br_2$ per tonne of ore. For high grade sources such as concentrates, the $Br_2$ concentration in the slurry may advantageously range from about 20 to about 200 pounds per tonne of concentrate. For recovery of Pd metal from a catalyst support, the $Br_2/Pd$ molar ratio is preferably between about 1 and about 8, and for recovery of Pt and Pd from high grade concentrates containing, for example 30–50 oz. Pd per ton, the molar ratio of $Br_2/Pd+Pt$ is preferably between about 2 and about 40.

As indicated by Eh/pH diagrams and experimental results, for dissolution of gold, the leaching solution should exhibit an oxidation reduction potential of between about 700–800 mv. For dissolution of Pt from a Pt compound such as a platinum oxide, an oxidation reduction potential of about 850–1250 mV is required. The oxidation reduction potential required to dissolve Pd is about 500–750 mv. As a consequence Pd may be leached with solutions containing only HBr, sulfuric acid, and optionally another source of bromide or other halide ion. For example, a leaching solution for Pd may contain between about 10 and about 20% by weight sulfuric acid, between about 15 and about 30% by weight HBr, between about 10 and about 25% by weight total bromide ion, and between about 20 and about 40% by weight total halide ion. However, the presence of $Br_2$ in the proportions outlined above is preferred for complete, rapid and efficient leaching.

If the source material is a refractory ore, it may be necessary to pretreat it for removal of sulfide and carbonaceous material. Such may be accomplished by methods known to the art such as roasting or pressure oxidation. Roasting may be sufficient pretreatment if carried out at a temperature of at least about 500° C. For the recovery of palladium from certain sources, it has been discovered that recovery may be improved if the ore is roasted at a temperature of at least about 900° C., preferably at least about 1000° C. For the recovery of gold and platinum, roasting at a temperature in the range of about 500° C. to about 750° C. is preferred. If pressure oxidation is performed, it is preferably in an autoclave under 150–300 psi oxygen pressure and at a temperature in the range of from about 150° C. to about 220° C. In addition to the recovery of gold from refractory ores, the leaching composition and method of the invention may also be used advantageously for recovery of gold from high grade non-refractory ores, low grade refractory and oxide ores, electronic component scraps, jewelry scrap and similar low grade refractory and oxide ores. The composition and method may be used for recovery of silver from various sources, including photographic film. The composition and method may also be used for recovery of platinum and/or palladium from ores, Pd catalysts and other sources.

The slurry of ore in leaching solution is preferably agitated to promote transfer of the precious metals to the aqueous phase. A leachate is thus produced containing gold, silve, platinum or palladium complexed with bromide ions. Although stated here in the alternative, it will be understood that many sources may provide leachates containing combinations of gold, silver, and platinum group metals. For gold and silver, leaching may be carried out for about 2 to about 6 hours at a temperature which is generally ambient, preferably in the range of from about 20° C. to about 30° C., more preferably from about 22° C. to about 25° C. For platinum and palladium, leaching may be carried out for up to about 20 hours or longer, preferably for about 4 to about 15 hours, more preferably for about 6 to about 10 hours. For sources containing platinum, leaching is preferably carried out at a temperature in the range of from about 50° C. to about 120° C., more preferably from about 60° C. to about 90° C., most preferably from about 80° C. to about 90° C.

After treatment of the metal source with the leaching solution is completed, the leachate is separated from the leached ore, catalyst substrate or other residue, as by filtration. The filter cake is washed with an aqueous washing medium, the spent wash solution is combined with the filtrate (leachate), and the combined filtrate and wash solution is treated for recovery of the metal therefrom. Advantageously, particularly in the case of silver, the filter cake is washed with a 2–4 molar HCl. Washing the filter cake in such fashion may be effective to remove further quantities of silver in the form of $AgCl_2^-$ from the cake. A washing solution of 4M HCl is especially preferred.

Gold may be recovered from the combined filtrate and wash solution by conventional means such as zinc or aluminum precipitation, ion exchange, carbon adsorption, or electrowinning. Platinum and palladium may be recovered from the combined filtrate and wash solution by conventional means such as solvent extraction, ion exchange and precipitative methods.

In disinfecting bodies of water, such as swimming pools and cooling tower basins, the concentrate may be added to the body of water in various ways, preferably by metering into a circulating stream of the water. For example, in the case of cooling tower treatment, the concentrate may be metered into the stream of water circulated between the cooling tower and heat exchanger(s) for which it provides cooling. In the case of a swimming pool, a stream of water may be continuously or intermittently withdrawn from the pool and circulated through a brominator to which the concentrate is added. If desired, the concentrate may be diluted with water before addition to the body of water to be treated.

In the case of swimming pool treatment, the concentrate should be added in a proportion sufficient to kill bacteria in the circulating water. This may also be done in the case of cooling tower water. Advantageously, however, cooling tower water is treated with only enough of the bromine concentrate to contain the growth of the microorganisms, but not enough to kill them. This method provides savings in the consumption of bromine, and minimizes corrosion to cooling tower components, piping and heat exchangers which utilize the cooling tower water. Preferably, the concentrate is metered into the cooling tower basin using a positive displacement pump, e.g., a diaphragm pump. A peristaltic pump is most preferred because it is self priming and not subject to back siphoning. By feeding at a rate sufficient to maintain a total residual oxidant (TRO) level of between about 0.2 and about 2 ppm, preferably between about 0.2 and about 0.7 ppm (measured as $Cl_2$), microfouling can be prevented while minimizing corrosion of pipes, pumps and other cooling tower system components.

Further in accordance with the present invention, it has also been discovered that bromine can be generated in aqueous solution to produce an aqueous bromine solution, and that the bromine solution generated can be used in an economically advantageous process for the leaching of gold, silver, platinum, and palladium from sources thereof. This solution has been demonstrated to be effective for recovery of these metals from ores in high yield and at commercially acceptable leaching rates. In an application unrelated to metal recovery, these electrogenerated bromine solutions are also effective for the treatment of water and in other disinfectant applications. In particular, the solution is effective for industrial water treatment applications, such as the treatment of cooling tower water, and in other water treatment applications such as the treatment of swimming pool water. Although the oxidizing potential of the solution is more than adequate for such purposes, the free bromine content is limited so that the vapor pressure of the solution is relatively low. Thus, the solution may be used without creating hazards to operating personnel in a metal recovery plant or water treatment facility, and without the necessity of expensive facilities for the protection of personnel from bromine release.

By controlling the relationship between current and the flow of electrolytic solution through the electrogeneration system, high current efficiencies can be realized in the process of the invention. By controlling the composition of the solution entering the electrogeneration system and creating sufficient turbulence in the system to minimize overvoltages, the power consumption per unit weight of bromine produced is maintained within acceptable limits. Where the aqueous bromine solution is used for leaching of precious metals, separation of product from the leaching solution produces a depleted bromide solution which can be recycled to the electrogeneration step. Unreacted bromide ion is thus reclaimed for conversion to bromine, thereby limiting the consumption of reagents and making it possible to operate a recovery process at lower reagent cost than a conventional cyanide or other recovery process. As a result, the process can be used in the recovery of precious metals from ores and other sources at operating costs that are quite competitive with the cyanide process.

Figure 7:
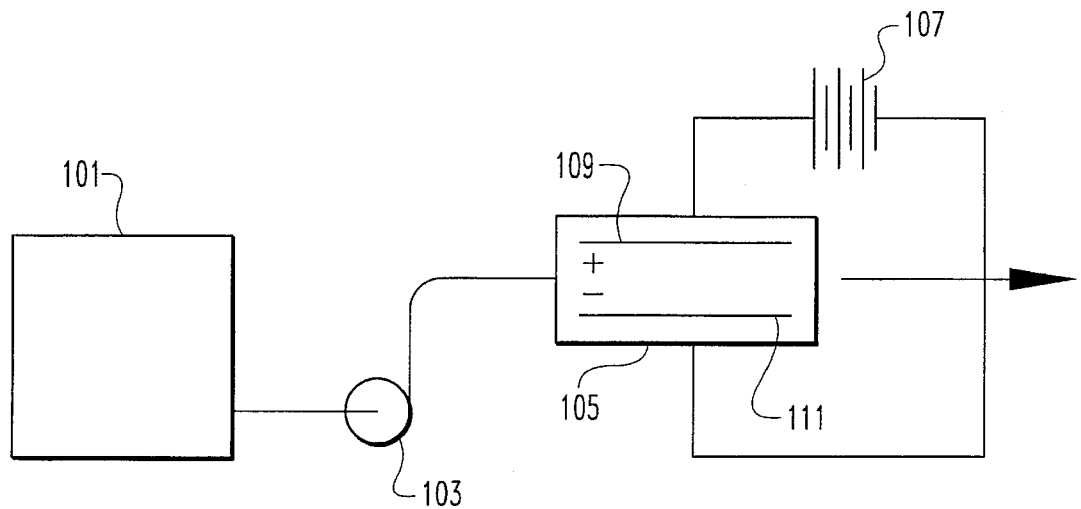
FIG. 7 is a schematic illustrating the electrogeneration process of the invention.

FIG. 7 is a schematic flow sheet of the electrogeneration process. A bromide solution prepared in a makeup tank 101 is transferred by a pump 103 to an electrolytic cell 105. Power is applied to the cell by a direct current power source 107 via an anode 109 and a cathode 111. The cell shown in FIG. 7 is an undivided cell, i.e., it contains no diaphragm or other impediment or obstruction to flow of electrolytic solution sufficient to cause a discontinuity in the concentration gradient between the anode and the cathode. Bromine is generated at the anode by the reaction:

$$2Br^- \rightarrow Br_2 + 2e^- \tag{14}$$

Hydrogen is generated at the cathode by the reaction:

$$2H^+ + 2e^- \rightarrow H_2 \tag{15}$$

or $$2H_2O + 2e^- \rightarrow H_2 + 2OH^- \tag{15A}$$

Although a single cell is illustrated in FIG. 7, it will be understood that the electrogeneration system may comprise a cell bank containing a plurality of cells. The cells of such a system may be arranged in a variety of ways, but are preferably connected electrically in series. Depending on production requirements, the desired equivalent bromine concentration of the product solution and electrical design considerations, several banks of cells may be used with the cells of each bank electrically in series, and the banks arranged either in series or in parallel with respect to each other. Depending on production requirements, the desired equivalent bromine concentration of the product solution, and the relationship of electrode area to flow of electrolytic solution, the cells may be hydraulically in series or hydraulically in parallel.

The feed solution entering the cell (or cell bank) from tank 101 has a pH of between about 0 and about 6, preferably between about 0 and about 3, and contains between about 0.5 and about 8.8 moles/l, preferably between about 0.5 and about 5 moles/l, bromide ion. Where a relatively concentrated product solution is desired, such as that suitable, for example, in the recovery of Au from jewelry scrap or Pd from a catalyst substrate or high grade concentrate, the feed solution preferably contains between about 0.25 and about 2.5 moles per liter bromide ion. Where a the product solution is used to treat a low grade source, such as a low grade Au ore, filter cake losses of bromide may be minimized by operating with a somewhat weaker feed solution, for example, a solution containing between about 0.0125 and about 0.625 moles per liter bromide solution. The feed solution may be prepared by dissolving an alkali metal bromide in water and acidifying with an acid such as HBr, sulfuric acid, or HCl to the desired pH. Thus, the solution may contain between about 0.5 and about 8.8 moles/l of sodium ion. Turbulent flow velocity and/or mechanical agitation in the electrode region is established at a level sufficient to minimize overvoltages and maintain the individual cell voltage in the range of between about 4 and about 5 volts at a current density in the range of between about 1.0 and about 4.0, preferably between about 2.0 and about 4.0, more preferably about 2.5 and about 3.0, kA/m$^2$. Preferably, feed solution is introduced into the cell at essentially ambient temperature. Temperature rise in the cell (or bank of cells) is in the range of between about 4° C. and about 20° C. Preferably, conditions are controlled to avoid increase of the cell discharge solution temperature to greater than about 50° C.

High current efficiency is maintained by controlling the relationship between current and the throughput of electrolytic solution through the system so that the conversion of bromide ion during passage through the cell bank is between about 4% and about 50%, preferably between about 5% and about 40%. For satisfactory productivity, the current density should be in the range of between about 2.0 and about 4.0 kA/m$^2$.

The product solution has a pH of less than 6, preferably less than about 4. If the product is to be used for the leaching of gold, it has a pH between about 0 and about 6, preferably between about 0 and about 3. If the product solution is to be used for the leaching of platinum or palladium, it has a pH of less than about 4, preferably less than about 1, most preferably less than about 0.

The product solution contains between about 0.01 and about 3.66 moles/l of equivalent bromine, between about 0.1 and about 4.0 moles/l unreacted bromide ion, and between about 0.1 and about 4.0 moles/l alkali metal ion. Preferably, the product solution containing between about 0.03 and about 2.5 moles/l, more preferably between about 0.1 and about 2.0 moles/l, equivalent bromine, between about 0.4 and about 3.0 moles/l, more preferably between about 0.6 and about 2.5 moles/l, bromide ion, and between about 0.4 and about 3.0 moles/l, more preferably between about 0.6 and about 2.5 moles/l, alkali metal ion. A solution used for recovery of precious metal from a high grade source preferably contains between about 8 and about 15 gpl equivalent bromine, between about 6 and about 12 gpl Br$^-$, and between about 10 and about 20 halide ion, while a solution used for recovery of Au or other precious metal from a low grade source, may suitably contain between about 0.01% and about 1%, preferably between about 0.02 and about 0.5%, by weight equivalent molecular bromine, between about 0.005% and about 10%, preferably between about 0.01% and about 1%, by weight bromide ion and between about 0.005% and about 15%, preferably between about 0.01% and about 1.5%, by weight total halide ion. Product solutions containing more than about 15 gpl equivalent Br$_2$ can be generated if desired but, in undivided cells, current efficiencies begin to deteriorate at product solution concentrations of around 10 gpl, and fall off sharply at product solution concentrations above about 15 gpl equivalent Br$_2$. If divided cells are used, current efficiencies of 90% or more can be realized in the generation of product solutions containing as high as 400 gpl or more equivalent Br$_2$.

Equivalent bromine is defined as the sum of the molar concentrations of molecular bromine, perbromide ion (Br$_3^-$), hypobromite ion, and hypobromous acid. It also includes any bromate ion present in the solution, but at the prevailing pH, no substantial bromate ion concentration would be anticipated. The molar ratio of equivalent bromine to bromide ion in the product solution is between about 0.05 and 0.6, preferably between 0.2 and 0.6. Throughout this range, the solution has substantial oxidizing power, but does not have a substantial bromine vapor pressure.

Where the solution leaving cell 105 is used in such applications as leaching of ore, a depleted bromide solution is produced which may optionally be recycled to tank 101 where it is replenished by addition of fresh bromide, preferably as hydrogen bromide, alkali metal bromide or a combination thereof, and adjusted with acid or base as necessary to provide a feed solution of the proper pH for electrolysis in cell 105.

To provide adequate conductivity and high current efficiency using only bromide ion as the oxidizable electrolyte, it is desirable that the electrolytic solution fed to the cell contain at least about 0.65 moles per liter bromide ion. It will be noted that this is substantially in excess of the bromide content necessary for generation of the 1–5 gpl equivalent Br$_2$ solutions that are optimal for precious metal sources such as low grade Au ores. In these circumstances, relatively high bromide ion consumption may result from the fraction of Br$^-$ in the spent ore residue discarded from the process. In a variation of the electrogeneration process of the invention, bromide consumption and power consumption are both reduced by use of a mixed halide electrolytic solution, specifically a solution containing both chloride and bromide ion. In this embodiment of the invention, the bromide ion content of the cell feed solution is preferably between about 0.065 and about 0.25 moles per liter and the chloride content is at least about 0.56 moles per liter, preferably between about 1.25 and about 2.25 moles per liter. The molar ratio of chloride ion to bromide ion is at least about 10, preferably at least about 25. In the operation of the cell with such feed solutions, a portion of the current is utilized in the oxidation of chloride ion to Cl$_2$, but the Cl$_2$ is quantitatively converted back to chloride by the oxidation of bromide to Br$_2$.

The mixed halide process is preferably operated at a bromide to bromine conversion in the upper portion of above noted range, generally between about 20% and about 50%, more preferably between about 30% and about 50%. The combination of high conversion and low bromide ion content in the feed solution results in advantageously low Br$^-$ consumption. While bromide ion conversion is relatively high, the total halide conversion is preferably in the low end of the 4 to 50% range, preferably between about 5% and about 15%. As a consequence, the mixed halide process can also be operated at high current efficiency and moderate power consumption. By operation at modest current density, for example, in the range of about 1 to about 2 kA/m$^2$, the mixed halide process can be operated with very low power consumption. By operation at higher current densities, high productivity is realized with modest power consumption.

In one preferred embodiment of the invention, electrolysis is conducted under the following conditions:

| | |
|---|---|
| Feed Solution Composition | 5 wt % Cl$^-$, 0.5 wt % Br$^-$ |
| Product Solution Composition | 0.2 wt % Br$_2$, 0.3 wt % Br$^-$, 5 wt % Cl$^-$ |
| Current Density | 100 mA/cm$^2$ |
| Avg Individual Cell Voltage | 2.25 V |
| Electrolysis Time | 4 hr |
| Current Efficiency | 78% |
| H$_2$SO$_4$ | 0.4 g dm$^{-3}$ |
| Br$_2$ | 1.75 g dm$^{-3}$ |

The bromine-containing product stream produced by electrolysis of the mixed halide stream may then be used in the recovery of precious metals or treatment of water as described herein.

As noted above, the electrogeneration system may comprise one or more banks of cells rather than the single cell that is illustrated in FIG. 7. Moreover, the electrogeneration system may operate on a continuous basis as shown in FIG. 7 or on a batch basis in which the electrolytic solution is circulated between the cell(s) and reservoir such as the bromide solution makeup tank until the desired conversion has been realized. In either case the cell(s) preferably operate on a flow basis, but in the latter (batch) case, recirculation is required to reach the desired conversion. Whether operation is continuous or batch, the relationship between electric current and throughput is such that the conversion of bromide ion is in the desired range described herein. It will be understood that, in a fully continuous operation, the throughput is the flow rate through the electrogeneration system, while in a recirculation or other batch operation the throughput is determined from the batch volume and time of application of power to recirculating solution.

In order to produce an aqueous bromine leaching solution at competitive cost, it is important that the cells of the electrogeneration system operate with high productivity and high electrical efficiency. High current efficiency is promoted in an undivided cell by operation at low bromide conversions, thereby minimizing the back reaction by which bromine is reduced to bromide ions at the cell cathode. Electrical efficiency is further promoted by the use of cells which are arranged to provide high rates of mass transfer between the bulk solution and the anode, thereby minimizing half cell overvoltage. High productivity is attained through high electrical efficiency, adequate current density, and a high ratio of electrode surface area to solution volume. Preferably, mass transport coefficient ($k_m$) for transfer of bromide ions from the bulk solution to the anode surface is at least about $5\times10^{-4}$ cm/sec. typically $5\times10^{-4}$ to about $5\times10^{-3}$ cm/sec. for the relationship:

$$I_L = F k_m C_R$$

where $I_L$ is the mass transport limited current density, F is Faraday's constant, and $C_R$ is the bulk concentration of the bromide ion. The ratio of anode surface to cell compartment volume is preferably at least about 80 cm$^{-1}$, more preferably 100–150 cm$^{-1}$. By operation within these parameters, productivities of between about $1\times10^{-3}$ and about $5\times10^{-3}$ moles $Br_2$ per hour per cm$^3$ of working volume in the cell can be achieved.

Figure 10:
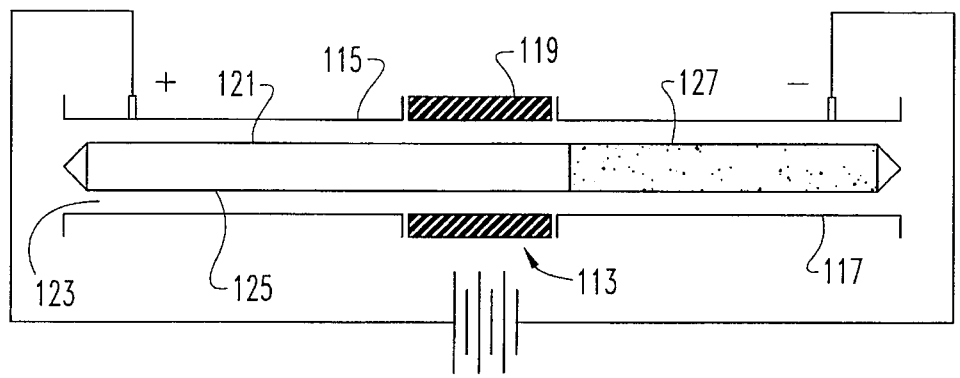
FIG. 10 is an illustration of a cell assembly that is especially preferred for use in the practice of the process of the invention.

FIG. 10 is a schematic illustration of a type of undivided cell that can be utilized effectively to provide the desired electrical efficiency and productivity discussed above. A cell of the type illustrated is available from Electrocatalytic, Inc., of Union New Jersey under the trade designation "Chloropac". This cell, which was originally developed for generation of hypochlorite in shipboard seawater systems, is described in detail in literature available from Electrocatalytic, Inc. The apparatus depicted in FIG. 10 is a bipolar dual cell assembly which comprises an outer electrode subassembly 113 that includes two outer cylindrical electrodes 115 and 117 that are substantially axially aligned and mechanically attached to each other through an insulating spacer 119. The cell assembly further comprises an inner cylindrical electrode 121 that is of smaller diameter than either of electrodes 115 and 117, is concentric therewith, and is substantially coextensive longitudinally with subassembly 113. The annular space 123 between subassembly 113 and electrode 121 provides the path along which electrolytic solution may be caused to flow through the cell. As illustrated in the drawing, outer electrode 115 serves as an anode to which current is supplied to the bipolar dual cell assembly and outer electrode 117 serves as a cathode from which current is withdrawn. Accordingly, the portion 125 of inner electrode 121 facing anode 115 serves as a cathode and the portion 127 of the inner electrode facing cathode 117 serves as an anode.

In a particularly preferred embodiment of the invention, each of electrodes 115, 117 and 121 is constructed of titanium, and both anode 115 and anodic portion 127 of electrode 121 are coated with platinum. The platinized surface catalyzes the anodic reaction and promotes generation of bromine at high current efficiency and minimum overvoltage.

In operation of the cell of FIG. 10, an electrolytic feed solution containing bromide ions is caused to flow through annular path 123 between the electrodes and a direct current is applied to the flowing solution. Bromide ions are oxidized to bromine at anodes 115 and 127, while hydrogen is generated in the solution at cathodes 117 and 125. To provide the desired rate of mass transfer from the bulk solution to the anode surface, the velocity through the cell is preferably about 1.22 to 2.44 m/sec., more preferably between about 1.52 and about 2.13 m/sec. Although the cells illustrated in FIG. 10 are particularly preferred, a variety of different cell designs may provide the high rates of mass transfer, even potential and current distribution and high ratio of electrode area to working volume that characterize the Chloropac type unit.

Figure 8:
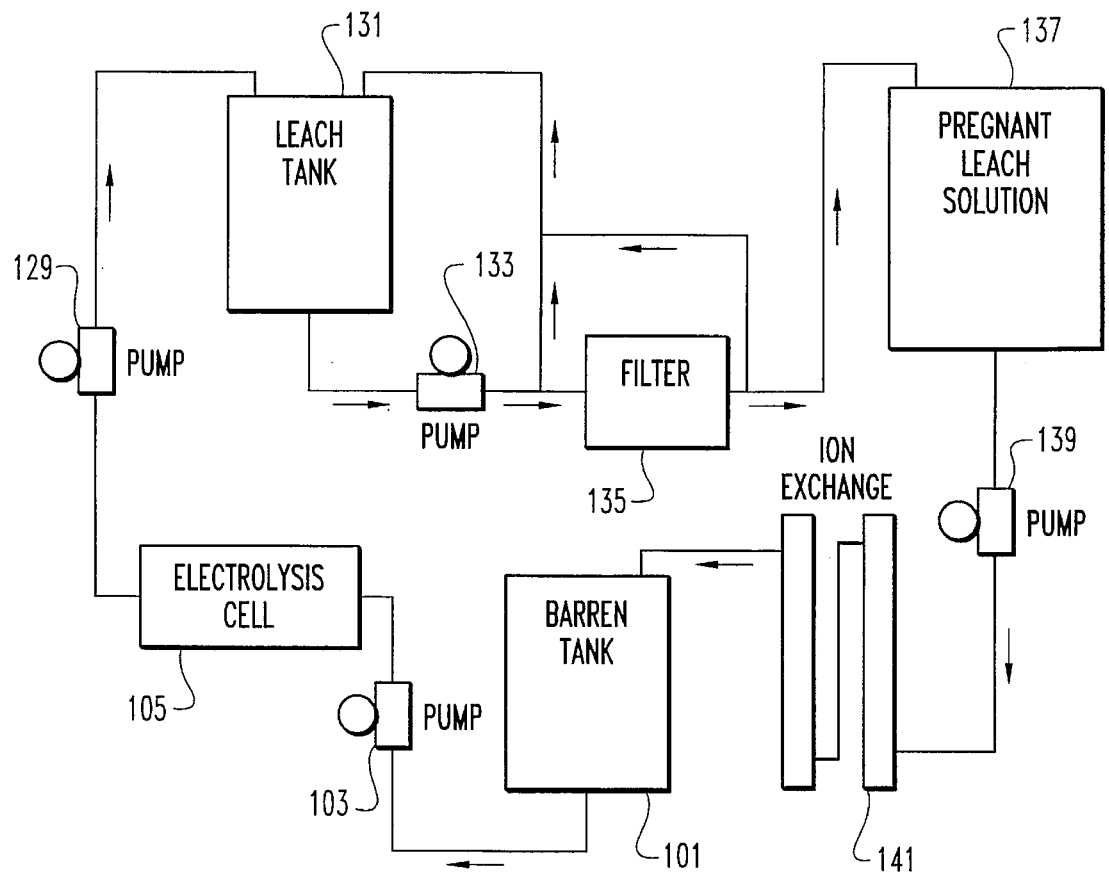
FIG. 8 is a general schematic showing the application of electrogeneration of bromine to the recovery of gold from a source material.

As noted, the bromine solution produced in the electrogeneration system is advantageously used for leaching of gold, silver, platinum or palladium from sources thereof. Illustrated in FIG. 8 is a process for recovery of gold includes a barren or makeup tank 101 in which electrolytic solution is prepared for delivery by a pump 103 to an electrogeneration system 105. Electrogeneration system 105 may consist of a single electrolysis cell or comprise a plurality of banks of cells, but in any case comprises paired anode and cathode means which may be either monopolar or bipolar, and which may be arranged in a variety of electrical and hydraulic configurations as discussed above. Aqueous bromine solution produced in system 105 is transferred by discharge pump 129 to a leaching tank 131 where it contacts a solid particulate source of gold, such as crushed gold ore. This causes the gold contained in the source to react with elemental bromine, perbromide ions, hypobromite ions and bromide ions to produce an aqueous auriferous solution containing $AuBr_4^-$ ions and a particulate residue. The resulting slurry is transferred from tank 131 by a pump 133 through a filter or other solid/liquid separation means 135 for separation of the solid residue from the pregnant leach solution, and thence to a pregnant leach solution tank 137.

Gold may be recovered from the pregnant leach solution by a variety of means, including zinc precipitation, carbon adsorption, solvent extraction, electrowinning, or ion exchange. The process of FIG. 8 causes the gold to be removed by ion exchange. Pregnant leach solution is transferred by a pump 139 to a pair of ion exchange columns 141 loaded with an ion exchange resin. $AuBr_4^-$ ions are removed from the solution and collected on the column. Residual bromine in the pregnant leach solution is reduced to bromide ion in the columns. Depleted bromide solution is returned to the barren tank 101, where it is replenished by addition of fresh bromide.

A very similar process may be used for the recovery of platinum and palladium from sources thereof. In each case, the electrolytic cells are operated with a feed composition and conversion effective to provide the leaching solution compositions described hereinabove. Sulfuric acid is preferably incorporated in the leaching solution, either by incorporation in the feed solution to the cells or by addition to the product solution to provide a leaching solution. In the case of platinum and palladium, the leaching solution is preferably heated to a temperature of at least about 60° C., preferably to 80°–90° C., either in the leaching vessel or immediately upstream thereof. In order to minimize environmental emissions of $Br_2$, the cells and the remainder of the system are preferably operated at $\leq 50°$ C. The leaching tank is preferably a closed tank which contains heating coils for heating the leaching slurry to the desired temperature. A heat exchanger in the slurry discharge line from the leaching tank (or filtrate discharge line from the filter) may be provided to cool the Pt bearing leachate. In order to provide the relatively concentrated leaching solutions (8–25 gpl equivalent $Br_2$) that are preferably used in leaching of high grade Pd/Pt ore concentrates, it may be advantageous to use divided cells in order to realize high current efficiencies.

Figure 9:
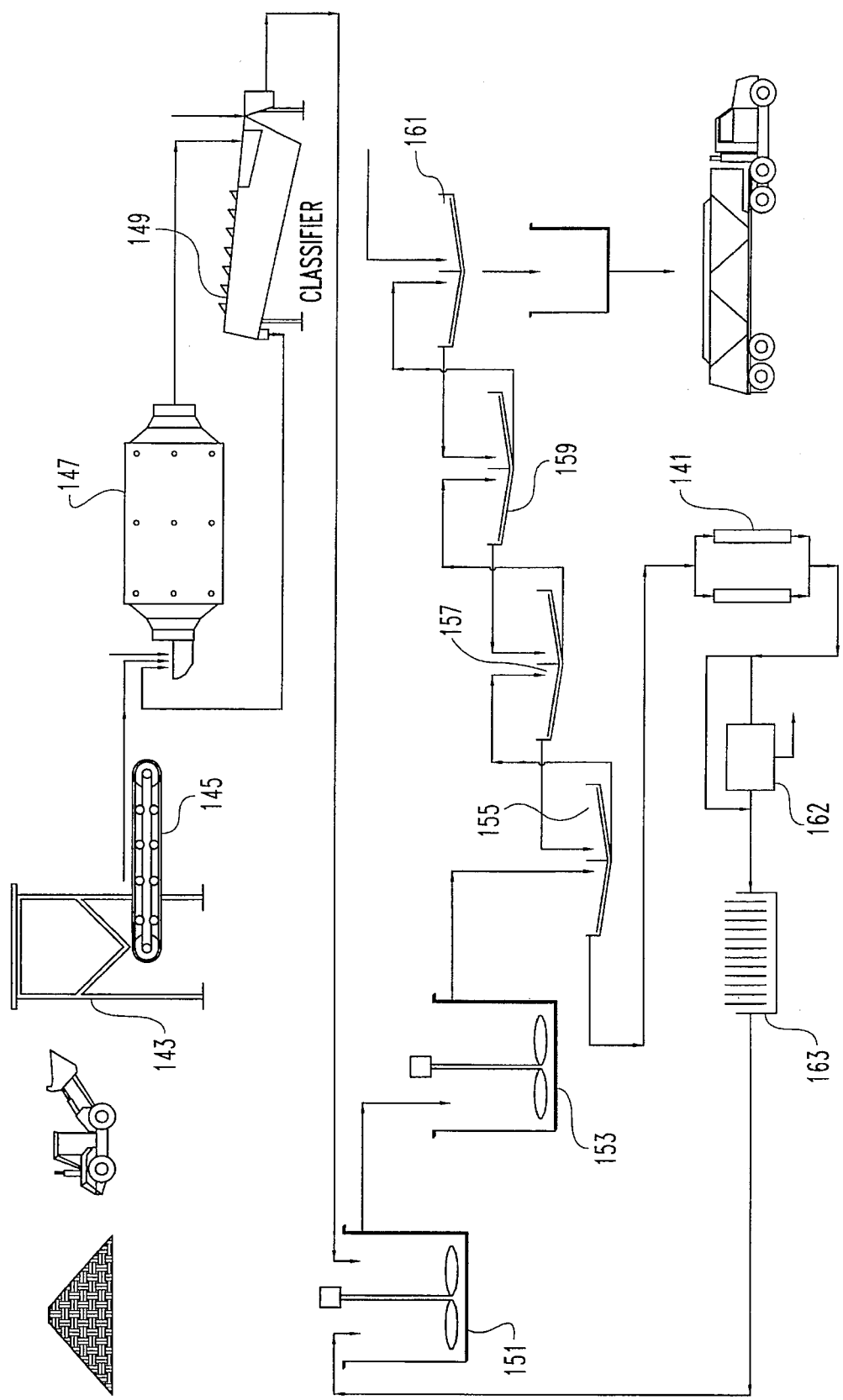
FIG. 9 is a more detailed schematic showing the application of the electrongeneration process of the invention to recovery of gold from ore.

An especially preferred gold leaching embodiment of the process of the invention is illustrated in FIG. 9. In this process, which operates on a continuous basis, gold ore is loaded into an ore bin 143 from which it is transferred by a conveyor 145 to a ball mill 147. Milled ore passes to a classifier 149. A fines fraction from the classifier is subjected to leaching for recovery of gold while a coarse fraction is recycled to ball mill 147. The fines fraction is delivered to the first of two cascade agitated leaching tanks 151 and 153 where it is contacted with an aqueous bromine solution. The resultant leaching slurry overflows tank 151 to tank 153 and overflows tank 153 to solids/liquid separation means comprising a thickener 155. Solids residue drawn from the bottom of thickener 155 is passed through a countercurrent washing system comprising thickeners 157, 159, and 161. An aqueous washing medium is fed to the last of the series of thickeners, thickener 161. Solids/liquid contact and separation in each thickener yields a liquid fraction that is transferred to the next thickener nearer the leaching system and a solids fraction which is transferred to the next thickener more remote from the leaching system. Thus, operation of the countercurrent washing system provides a liquid stream which moves with progressively increasing gold content from thickener 161 to thickener 155 and a solids stream which moves with progressively decreasing gold content from thickener 155 to thickener 161. Solid tailings are withdrawn from the bottom of thickener 161.

In thickener 155, the wash liquor containing soluble gold recovered from the residue mixes with the pregnant leach solution from leaching tank 153 to produce an auriferous solution that is transferred to ion exchange columns 141. Removal of gold by ion exchange produces a depleted bromide solution which is recycled for use in generating additional aqueous bromine solution. To maintain the water balance of the plant, the depleted bromide solution is concentrated by passing all or part of the solution through a reverse osmosis unit 162. Water removed by the reverse osmosis unit is used in the circuit or purged from the process. The concentrated bromide solution is transferred to the electrogeneration system 163. Electrogeneration system 163 includes a makeup tank (not shown) and one or a plurality of cells in which bromide is converted to bromine as discussed above. The spent bromide solution is replenished by addition of alkali metal bromide and acid in the makeup tank, thus producing fresh feed solution for the cells of the electrogeneration system. The aqueous bromine solution leaving system 163 has the composition described hereinabove and is effective for the removal of gold from ore. This solution is recycled to leaching tank 151 for further recovery of gold from ore.

Ion exchange columns 141 contain a commercial anion exchange resin such as the resin comprising secondary amine functional groups combined with a phenol-formaldehyde matrix sold under the trade designations "PAZ-4" by Sela, Inc., the resin comprising trimethylamine functional groups combined with a styrene/divinylbenzene matrix sold under the trade designation "DOWEX-21K" by Dow Chemical Company, and the polyester resin sold under the trade designation "Amberlite XAD-7" by Rohm and Haas. The gold loading capacity of PAZ-4 and DOWEX-21K is in the neighborhood of 80–120 oz./cubic foot, while that of XAD-7 is in range of about 10–20 oz./cubic foot. In batch tests, 80% loading is typically achieved in 1–2 hr. and maximum loading is reached in about 3–6 hr. These data allow specification of ion exchange column height and resin requirements in accordance with conventional design criteria. An acidic ketone solution, for example an acetone/HCl solution, is preferably used for elution of the column. Other eluents such as thiourea/HCl may also be used.

As noted, gold may be recovered from the auriferous solution by other means, such as carbon adsorption, zinc precipitation or solvent extraction. A particularly preferred method of recovery is by adsorption on sphagnum moss. This process is described in U.S. Pat. No. 4,936,910 which is expressly incorporated herein by reference. In this process, acid washed sphagnum peat moss, having a particle size typically in the range of −10 to +200 mesh, is contacted with the auriferous solution in a suitable contacting apparatus. Conveniently, the auriferous solution may be passed through an ion exchange column that is packed with sphagnum moss in lieu of a conventional ion exchange resin. Alternatively, the moss may be slurried in the auriferous solution and thereafter separated from the aqueous phase by filtration after transfer of gold from the solution to the moss. For contact with sphagnum moss, it is preferred that the pH of the auriferous solution be less than about 7, preferably between about 2 and about 5. The moss has a capacity for adsorbing approximately 32 mg. Au per gram. After adsorption and removal of the aqueous phase by filtration, the gold bearing sphagnum moss is burned to an ash which is smelted to recover the gold.

Figure 11:
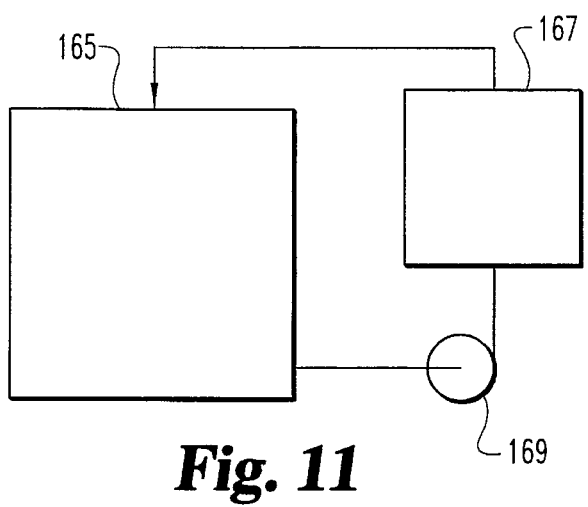
FIG. 11 is a schematic flow sheet of an alternative embodiment of the process for recovery of gold in which an aqueous bromine leaching solution is circulated between a leaching tank and an electrogeneration system.
Figure 12:
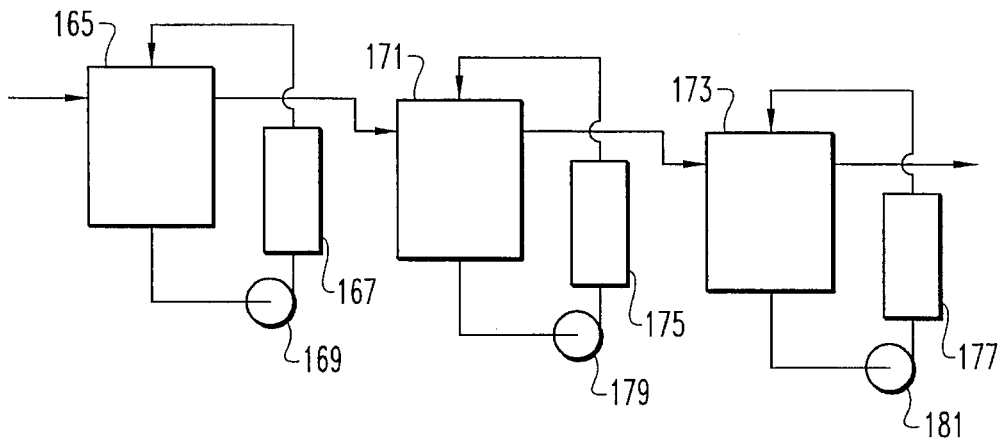
FIG. 12 is a schematic flow sheet showing the application of the principles of the process of FIG. 11 to a continuous cascade leaching reactor system.

Illustrated in FIG. 11 is an alternative embodiment of the invention in which a slurry of leaching solution and particulate gold-bearing material is circulated between a leaching zone (contained within leaching tank 165) and an electrogeneration system 167 by operation of a high volumetric capacity circulating pump 169. In this process, the driving force for gold leaching may be enhanced by maintaining (or restoring) a high bromine content in the leaching solution. Conditions for operation of the cell or cells of the electrogeneration system are comparable to those for the processes of FIGS. 8 and 9, except that back mixing in the leaching tank causes the feed solution to the cells to have a somewhat lower bromine content than in the other processes. The latter effect can be minimized by baffling the leaching tank or using a pipe reactor to approach plug flow conditions. As illustrated in FIG. 11, this process operates on a batch basis. However, FIG. 12 shows how the principle of the process of FIG. 11 can be implemented in a continuous operation. In FIG. 12, each of a series of cascaded leaching tanks 165, 171, and 173 is associated with an electrogeneration system, and leaching slurry is circulated between each leaching tank and its associated cell(s) 167, 175, and 177 respectively by means of pumps 169, 179 and 181, while leaching slurry moves forward progres- sively from tank to tank. Such a scheme may be integrated into the process of FIG. 9, with or without an electrolytic system for regeneration of depleted bromide solution passing from the ion exchange column to the first leaching tank.

The processes illustrated in FIGS. 8–12 can also be used for the recovery of Pd and Pt from sources thereof. The feed solutions and cell operating conditions are controlled to produce product solutions that have the desired compositions of Pd/Pt leaching solutions, or which may be readily modified to produce such leaching solutions. As noted, leaching solutions for Pd/Pt preferably contain HCl, HBr or $H_2SO_4$, most preferably $H_2SO_4$ in a proportion of between about 10% and about 20% by weight. To produce the desired leaching solution, acid may be added to either the feed solution or the product solution. Regardless of which acid predominates in the leaching solution HBr is advantageously used for makeup in a recirculating system of the type illustrated in FIGS. 8 or 9. Since both $H^+$ and $Br^-$ are consumed in the process, HBr provides a suitable source of both. Sulfate ion is consumed, for example, through environmental losses, with catalyst substrate or spent ore residue, in the acidulation of a catalyst substrate or ore gangue, or in competition with the complexed metal anion for ion exchanger resin sites. Thus, makeup of sulfuric acid is required. Whatever acid or combination of acids is used, acid makeup may be either before or after electrolysis, but is preferably done before.

In providing a leaching solution of the desired combination of pH, sulfate ion content, and bromide ion content, alkali metal bromide is commonly used as a source of bromide ion. Alkali metal is lost only marginally, primarily by environmental losses or with catalyst substrate or spent ore residue. Alkali metal bromide is added to compensate for these marginal losses of alkali metal ion, and is preferably added upstream of the electrolytic cells.

In accordance with the invention, electrogeneration of bromine to produce an aqueous bromine solution can also be conducted in divided cells. Such process may be carried out in a conventional plate and frame cell construction, using a diaphragm that preferably comprises a cation exchange membrane such as the perfluorosulfonic acid membrane sold under the trade designation "Nafion" by E.I. du Pont de Nemours & Co. The anode is preferably constructed of graphite, vitreous carbon, or the ceramic sold under the trade designation Ebonex by Ebonex Technology, Inc., or platinum, ruthenium dioxide, or iridium dioxide on a titanium substrate. The bromide ion content of the feed solution to the anode compartment of the cell is substantially the same as that of the solution described above for feed to an undivided cell. However, bromide ion can be supplied either in the form of an alkali metal bromide, in which case the pH of the feed solution is between about 0 and about 6, preferably about 0 to about 3, or hydrobromic acid, in which case the pH of the feed solution is approximately 0 or less. A proton source such as sulfuric acid or hydrochloric acid is fed to the cathode side of the cell.

Operating conditions are generally the same as described above for undivided cells, except that somewhat higher conversions can be tolerated without loss of current efficiency. Using a divided cell, the conversion of bromide ion in the electrogeneration system is typically between about 4% and about 50%, preferably between 20% and 40%. Thus, the equivalent bromine content of the product solution is between about 0.01 and about 3.66 moles/l, preferably between about 0.4 and about 3.0 moles/l, more preferably between about 0.2 and about 1.0 moles/l. Where an alkali metal bromide is used as the source of bromide ion, the product solution has a pH of between about 0 and about 6, preferably between about 0 and about 3, and an alkali metal ion content of between about 0.1 and about 4.0 moles/l, preferably between about 0.4 and about 3.0 moles/l, more preferably between about 0.3 and about 1.5 moles/l. The product of a divided cell is particularly advantageous in such applications as industrial water treatment, such as cooling tower water, where the higher equivalent bromine concentration facilitates treatment of substantial volumes of water with modest volumes of aqueous bromine solution. It is also advantageous for such leaching applications as recovery of Au from jewelry scraps, Pd from catalyst substrate, and Pt/Pd from high grade ore concentrates.

Where the product solution is used in leaching gold, it is generally preferred that the feed solution to the anode compartment comprise an alkali metal bromide. This is particularly so in application of bromine leaching to the process in which sphagnum moss is used in recovery of gold from the leaching solution in accordance with the method described in U.S. Pat. No. 4,936,910.

Figure 13:
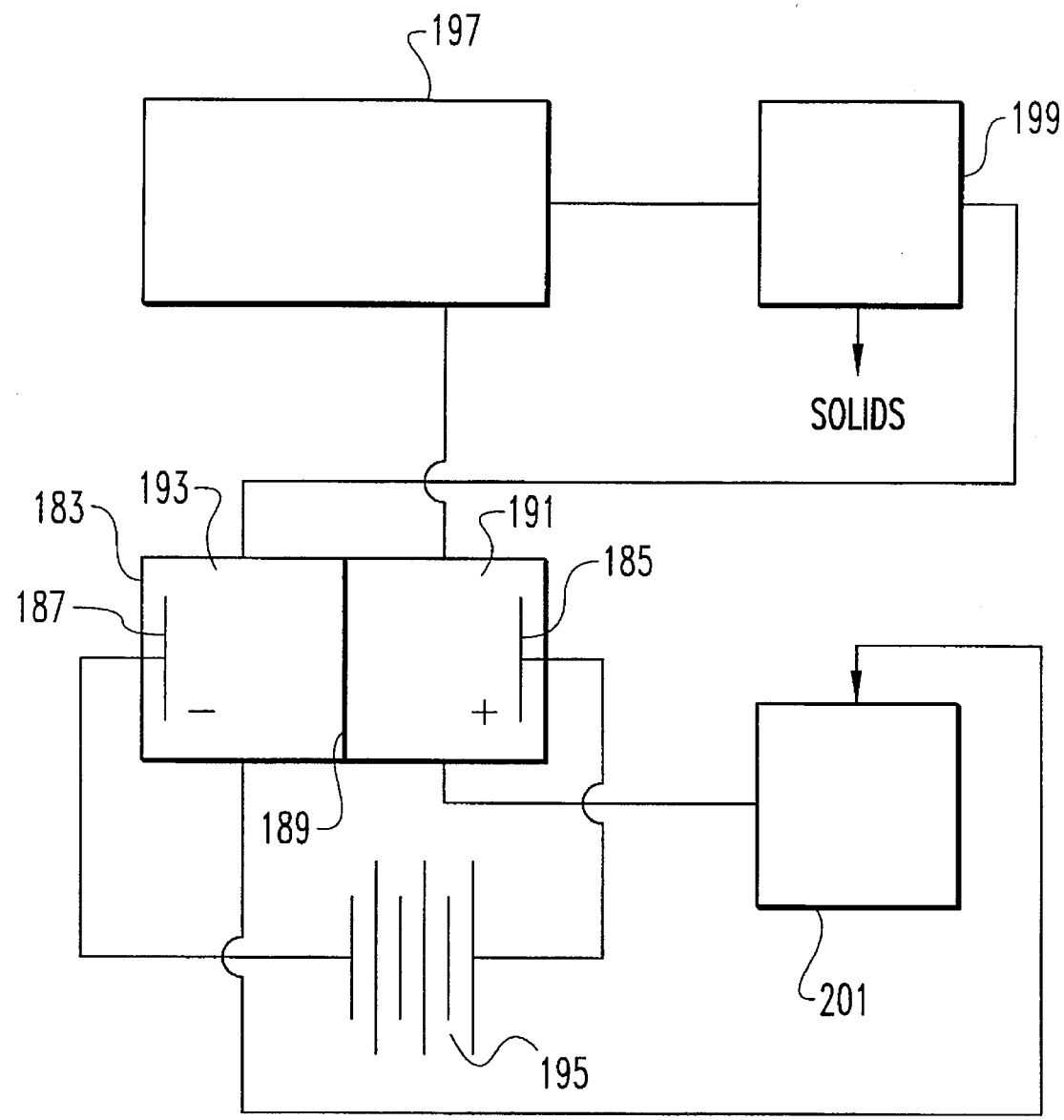
FIG. 13 illustrates an especially preferred embodiment of the invention in which an aqueous leaching solution containing bromine is produced at the anode of a divided electrolytic cell and gold is recovered from a pregnant leach solution by electrowinning at the cathode of the same cell.

Further in accordance with the invention, it has been discovered that an auriferous solution comprising the pregnant leach solution can be introduced into the cathode compartment of a divided cell, and gold directly recovered at the cathode. A schematic flow sheet illustrating this unique and advantageous electrowinning process is illustrated in FIG. 13. The system includes a container 183 containing an anode 185 and a cathode 187 separated by a hydraulically impermeable membrane 189 comprising a cation exchange resin which divides the cell into an anode chamber 191 and cathode chamber 193. Direct current power is applied to the cell by a power source 195. Anolyte from chamber 191 is transferred to a leaching tank 197 where it contacts a particulate source of gold to produce a pregnant leaching solution containing $AuBr_4^-$ ions. A slurry of the pregnant leaching solution and solid residue is transferred to a solid/liquid separation means such as a filter 199 where the solid residue is removed and washed with an aqueous washing medium to produce an auriferous solution from which gold may be recovered.

The auriferous solution from filter 199 is introduced into the cathode chamber 193 of the cell, where $AuBr_4^-$ is cathodically reduced to deposit gold on the cathode. The cathode is preferably constructed of nickel foam, nickel mesh, or steel wool. The gold bearing cathodes are periodically removed from the cell and the gold recovered therefrom. Catholyte leaving the cell is recycled to a bromide solution makeup tank 201 where it is replenished by addition of alkali metal bromide prior to introduction into the anode chamber of the cell.

The feed solution introduced into anode chamber 191 from makeup tank 201 has the composition described hereinabove in connection with FIGS. 7–10, and the anolyte transferred from cathode chamber 193 to leaching tank 197 comprises an aqueous bromine solution also having a composition as described above. Conditions in the leaching tank 197 are essentially the same as those of the processes of FIGS. 7–10.

The auriferous solution introduced into cathode chamber 193 contains between about $6 \times 10^{-6}$ and about $1.2 \times 10^{-2}$, preferably about $1.2 \times 10^{-5}$ to about $1.2 \times 10^{-3}$, moles per liter $AuBr_4^-$, between about 0.1 and about 4.0, preferably between about 0.4 and about 3.0, moles per liter bromide ion, and between about 0.1 and about 4.0, preferably between about 0.4 and about 3.0, moles per liter alkali metal. The pH of the cathode feed solution is typically in the range of between about 0 and about 6, preferably between about 0 and about 3. The temperature of the catholyte in the cathode chamber is in the range of between about 10° C. and about 50° C. The overall cell voltage is typically in the range of about 3 V and about 6 V.

A substantial amount of hydrogen is released together with gold at the cathode, so the cathodic current efficiency of the cell is relatively low, in the range of between about 0.1 and about 1%. Nonetheless, because of the value of the gold and the complications of other recovery methods, the cell operation is cost efficient compared to other methods of gold recovery. Moreover, recovery of gold at the cathode is essentially quantitative, so that, under most conditions, the catholyte discharged from the cell is completely devoid of $AuBr_4^-$ or other Au species. However, any residual gold in the catholyte is recovered since the catholyte is recycled to the bromide solution makeup tank and thence through the anode chamber of the cell to the leach tank.

It will be understood that the process for recovery of gold from leach solution may be carried out at the cathode of a divided cell in which the anode reaction is other than the electrogeneration of bromine. However, the integrated process described above provides unique advantages in process design, operation, and economics, and is thus highly preferred.

For commercial or industrial treatment of water, a biocidally effective amount of the aqueous bromine solution produced in the electrogeneration process is introduced into the water to be treated. For example, in treatment of swimming pool water, a treatment solution comprising the aqueous bromine solution may be injected via a brominating apparatus into a stream that is circulated between the pool and the apparatus. Cooling tower water may be treated by injection of the treating solution into the sump of the tower, into the main flow of water circulated through the tower, or into a side stream circulated through a brominating apparatus. In either case, the frequency, duration and dosage of aqueous bromine solution is sufficient to suppress the growth of microorganisms. In swimming pool treatment, the bromine is preferably supplied at a rate which kills bacteria. In the case of cooling tower water, the dosage need not necessarily kill bacteria, but only limit bacterial growth to control biofouling.

The amount of aqueous bromine solution required to meet these criteria is dependent on a number of factors, among which include the volume of the recirculating system, the temperature and pH of the water therein, the location of the system (i.e., whether the system is located in an area where bacterial nutrients may easily enter the system), the quality of makeup water, and the amount of bacterial growth present at the time treatment is begun.

In a new recirculating system, bacterial growth may be easily controlled by simply adding an amount of aqueous bromine solution to the water and observing the results. If, after a period of time there is an observed build up of algae, bacteria, etc., the amount of aqueous bromine solution should be increased. If no build up occurs, the quantity of bromine solution may be reduced until an accumulation of bacteria is noted, at which time the rate of addition of bromine solution may be increased. Through such "trial and error" tests, the preferred quantity of bromine solution needed for biomass control for any system can be easily established.

Generally, aqueous bromine solution is provided in sufficient proportion that at least about 0.10 pound of bromine is provided daily per thousand gallons of water in the system. In determining the proper amount of bromine solution to be used, system volume is first ascertained. In the case of an open recirculating water system, system volume is normally calculated based on the amount of contained water plus daily makeup for evaporation losses and blowdown. Once the total volume is determined, the appropriate bromine level may be selected, with the final level being optimized on a step-by-step basis in the described manner.

Preferably, bromine is provided at a rate of between about 0.05 and about 0.15 pounds per thousand gallons per day. The benefits of treatment are achieved with larger amounts of bromine (e.g., at rates of 0.5 pounds per 1000 gallons of water or higher) although such higher quantities are typically only required where the system is quite dirty and then only for a relatively short period of time (e.g., a few days to a few weeks).

Aqueous bromine water can also be applied very efficiently on a shock basis. Typical recommendations are to feed bromine solution for one hour intervals, two to three times per day. The main purpose of shock feeding is to use less chemical while maintaining an ever decreasing biocount. Bromine solution can be introduced at a rate sufficient to provide about 1 to about 5 pounds per hour for every 1000 gpm of flowing water. As needed, the rate of introduction can be as high as 15 lb/hr for each 1000 gpm.

Ordinarily, biofouling is controlled by retaining a measurable halogen residual in the recirculating water (all day or for shocking interval) and without complete destruction of all microorganisms in the bulk water phase.

As noted, biocidal effectiveness in cooling tower and water recirculating systems is not dependent upon complete biological kill of all microorganisms existing within the recirculating water. Rather, in cooling tower and water recirculating systems, it has been found that it is only necessary to substantially kill the microorganisms which adhere to the walls and other film forming structural surfaces of the system. Once such localized organisms are killed, the total microorganism count in the recirculating water is essentially irrelevant to the efficacy of the water treatment method; that is, as long as the microorganisms are in circulation in the system (i.e., not adhering to the walls or other structural surfaces of the system), there is no noticeable detrimental effect on the heat-exchange capacity of the system.

As a result, the novel method of the present invention does not have as its objective the complete eradication of all microorganisms from the recirculating water but, instead, is intended to remove microorganism growth and biofilm from the surfaces of the recirculating water system. Thus, the term "biocidally effective" as used herein should be understood to refer to the selective attack on biofilm forming organisms located at system surfaces but should not be understood to mean the substantial elimination of bulk water phase microorganisms.

Other applications of the process of this invention include disinfection and other biological control of aqueous systems in the industrial and consumer home use, as follows:

Industrial Applications
    Recirculating cooling water
    Once-through cooling water waste water
    Brewery pasteurizer water
    Air washer water
    Evaporative cooling water
    Air scrubber systems
    Humidifier systems
    Oilfield injection water
    Pond and lagoon water
    Degreaser disinfectants Closed cooling system water
Irrigation system disinfection
Metal working system disinfection
Food plant disinfection
Bleaching—pulp & paper
Textile
Metal etching
Metal Extraction Consumer Applications
 Toilet bowl cleaners/disinfectants
 Hard surface cleaners/disinfectants
 Air conditioning pan water
 Decorative fountain water
 Tile & grout cleaners
 Bleaching agent compositions
 Dishwashing formulation
 Laundry formulation
 Pool biocontrol/disinfection
 Spas & hot tub biocontrol/disinfection Thus, the term "aqueous system" as used herein encompass all such systems.

The following examples illustrate the invention.

EXAMPLE 1

Precursor compositions were prepared by adding a 48% HBr solution and a 46% NaBr solution to water. Liquid bromine was added to the precursor solution to produce acidic concentrates containing 34% by weight equivalent molecular bromine. Satisfactory solutions were prepared from the proportions of water, HBr solution, NaBr solution and liquid bromine set forth in Table 1.

TABLE 1

| Composition | H$_2$O(g) | 48% HBr(g) | 46% NaBr(g) | Br$_2$(g) | pH |
|---|---|---|---|---|---|
| 1 | 26 | 10 | 30 | 34 | <0 |
| 2 | 16 | 20 | 30 | 34 | <0 |
| 3 | 6 | 30 | 30 | 34 | <0 |
| 4 | 36 | 10 | 20 | 34 | <0 |
| 5 | 24 | 20 | 20 | 34 | <0 |
| 6 | 14 | 30 | 20 | 34 | <0 |
| 7 | 36 | 20 | 10 | 34 | <0 |
| 8 | 26 | 30 | 10 | 34 | <0 |

These solutions were clear and stable. No phase separation occurred on standing.

EXAMPLE 2

Using the method generally described in Example 1, acidic concentrates containing 34% by weight equivalent molecular bromine were prepared from water, a 46% by weight NaBr solution, and a 37% by weight HCl solution. Satisfactory compositions were prepared from the proportions set forth in Table 2.

TABLE 2

| Composition | H$_2$O(g) | 37% HCl(g) | 46% NaBr(g) | Br$_2$(g) |
|---|---|---|---|---|
| 9 | 26 | 26 | 10 | 30 | 34 |
| 10 | 26 | 26 | 10 | 30 | 34 |
| 11 | 16 | 16 | 20 | 30 | 34 |
| 12 | 6 | 6 | 30 | 20 | 34 |
| 13 | 24 | 24 | 20 | 20 | 34 |
| 14 | 14 | 14 | 30 | 20 | 34 |

EXAMPLE 3

Using the method generally described in Example 1, acidic concentrates containing 34% by weight equivalent molecular bromine were prepared from water, a 48% by weight HBr solution, a 52% by weight CaBr$_2$ solution, and liquid bromine. Satisfactory compositions were prepared from the proportions set forth in Table 3.

TABLE 3

| Composition | H$_2$O(g) | 48% HBr(g) | 52% CaBr$_2$(g) | Br$_2$(g) | pH |
|---|---|---|---|---|---|
| 15 | 26 | 10 | 30 | 34 | <0 |
| 16 | 16 | 20 | 30 | 34 | <0 |
| 17 | 6 | 30 | 30 | 34 | <0 |
| 18 | 36 | 10 | 20 | 34 | 0.6 |
| 19 | 24 | 20 | 20 | 34 | 0.2 |
| 20 | 14 | 30 | 20 | 34 | <0 |
| 21 | 36 | 20 | 10 | 34 | 0.7 |
| 22 | 26 | 30 | 10 | 34 | 0.4 |

Additional compositions were prepared from CaBr$_2$, Br$_2$, methanol, either HBr or HCl and, optionally, water. Satisfactory compositions were prepared from the proportions set forth in Table 4.

TABLE 4

| Comp. # | H$_2$O(g) | 48% HBr(g) | 37% HCl(g) | 52% CaBr$_2$(g) | Br$_2$(g) | MeOH(g) |
|---|---|---|---|---|---|---|
| 23 | — | 30 | — | 20 | 34 | 16 |
| 24 | 10 | — | — | 41 | 34 | 15 |
| 25 | — | 33 | — | 33 | 34 | — |
| 26 | — | — | 16 | 30 | 34 | 20 |
| 27 | — | — | — | 40 | 34 | 20 |

EXAMPLE 4

Acidic concentrates were prepared from water or organic solvent, 46% by weight NaBr solution, 48% HBr solution, and liquid bromine. NaBr and HBr solution were added to the water or organic solvent, and liquid bromine was added at a modest rate to the precursor mixture. The mixture was stirred constantly but not too vigorously during the addition of Br$_2$. Four separate concentrates were prepared, each of which was a stable, clear liquid. The partial vapor pressures were measured 24 hours after the concentrates were formulated. The compositions of these concentrates, their bromine partial vapor pressures and the thermodynamic crystallization temperatures are set forth in Table 5.

TABLE 5

Physical and Chemical Characteristics of formulations of Example 4

| Parameters | Comp. #28 | Comp. #29 | Comp. #30 | Comp. #31 |
|---|---|---|---|---|
| Wt. % $H_2O$ | — | — | 6 | 10 |
| Wt. % Methanol | 15 | 26 | — | — |
| Wt. % 46% NaBr, or 52% $CaBr_2$, or 38% KBr or 54% LiBr | 25 | 42 | 30 | 20 |
| Wt. % 48% HBr | 25 | — | 30 | 36 |
| Wt. % $Br_2$ | 34 | 34 | 34 | 34 |
| % Available $Br_2$ by Titration | 33.6 | 34.6 | 35.1 | 34.5 |
| Density (g/mL) | 1.67 | 1.56 | 1.92 | 1.72 |
| Partial Vapor Pressure (mm Hg at 20° C.) | 22.5 | 39.5 | 48.5 | 39.5 |
| Crystallization Temp. (°C.) | −55 < X < −68 | X < −68 | −50 | −30 |
| pH | X < 0 | 0.11 | X < 0 | X < 0 |

Tests were conducted on the solubility of gold in these concentrates. Solubilities at five different equivalent molecular bromine concentrations were tested for each of the concentrates by dilution of the concentrate with water prior to testing its solubility. These concentrations were 2.00 g/L, 1.00 g/L, 0.40 g/L, 0.20 g/L and 0.10 g/L of each of the above 4 different 34% bromine concentrates. The amount of gold added to the concentrate was varied with the bromine content. After each gold specimen had been agitated in the diluted concentrate for 24 hours, the solutions were filtered using a 0.45 micron membrane. Gold analysis was conducted by ICP using a Thermo Jarrell Ash Atomscan 25. The gold solubility is set forth in FIG. 1.

Figure 2:
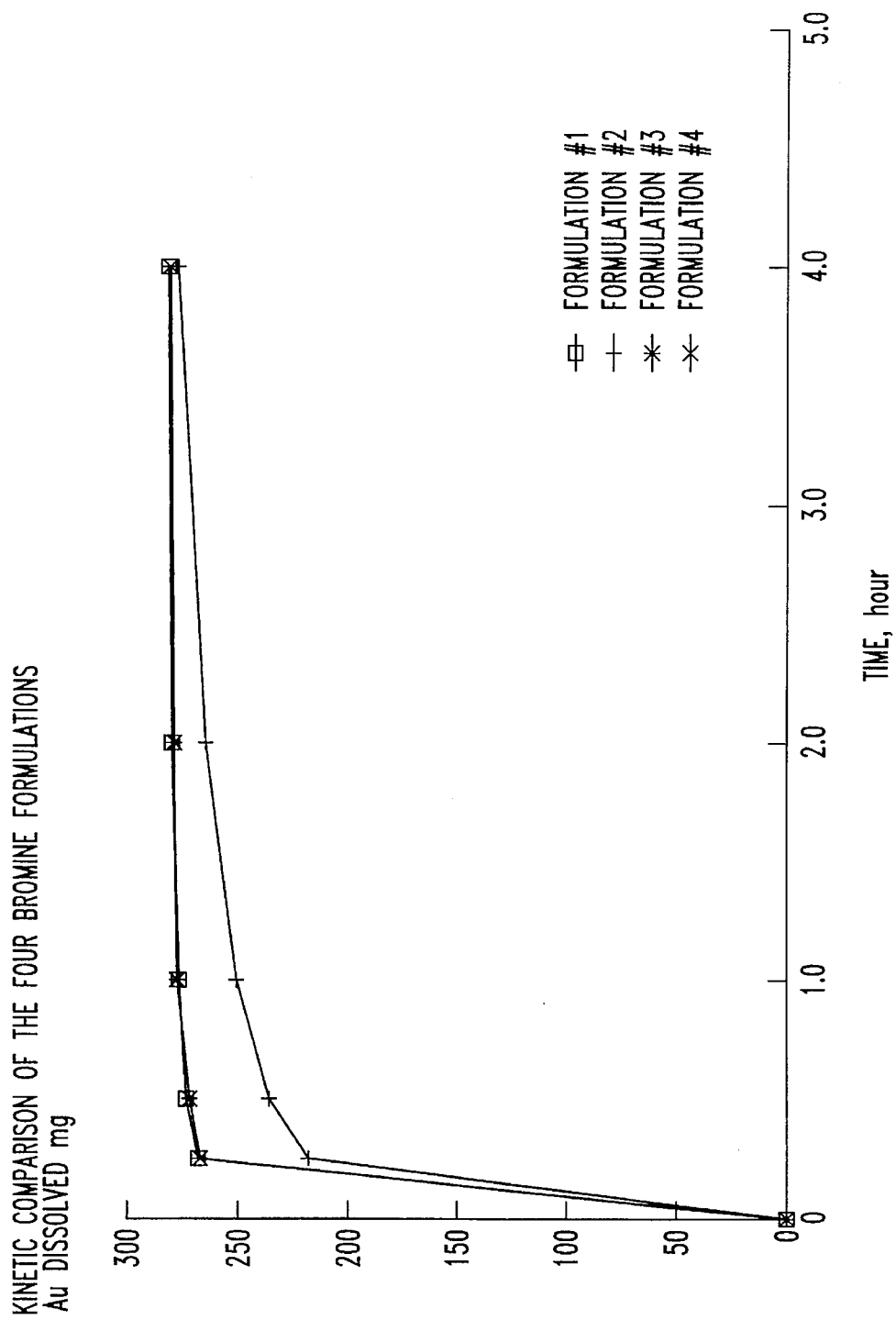
FIG. 2 is a plot of amount of gold dissolved vs. time for simulated batch kinetic tests of the dissolution of gold in the concentrates of Example 5 herein.

Simulated batch kinetic tests were also conducted to determine the activity of each of the concentrates of this example for the dissolution of gold. The experiments were performed using Corning stir plates and sealed glass bottles. In each test run, a specimen of minus 325 mesh powdered gold (99.99% purity) was introduced at a concentration of 0.6 g/L into a specimen of the concentrate which had been diluted to a concentration of 2 g/L equivalent molecular bromine. The total volume of the kinetic test batch was brought to 500 mL by addition of deionized water. The resulting mixture was agitated at room temperature. Samples of 20 mL each were withdrawn at time intervals of 0.25, 0.5, 1, 2, 4, and 24 hours. The volume of the batch was held constant during the test period by additions of deionized water equivalent in volume to the sample withdrawn. The results of the kinetic tests are set forth in FIG. 2.

Figure 3:
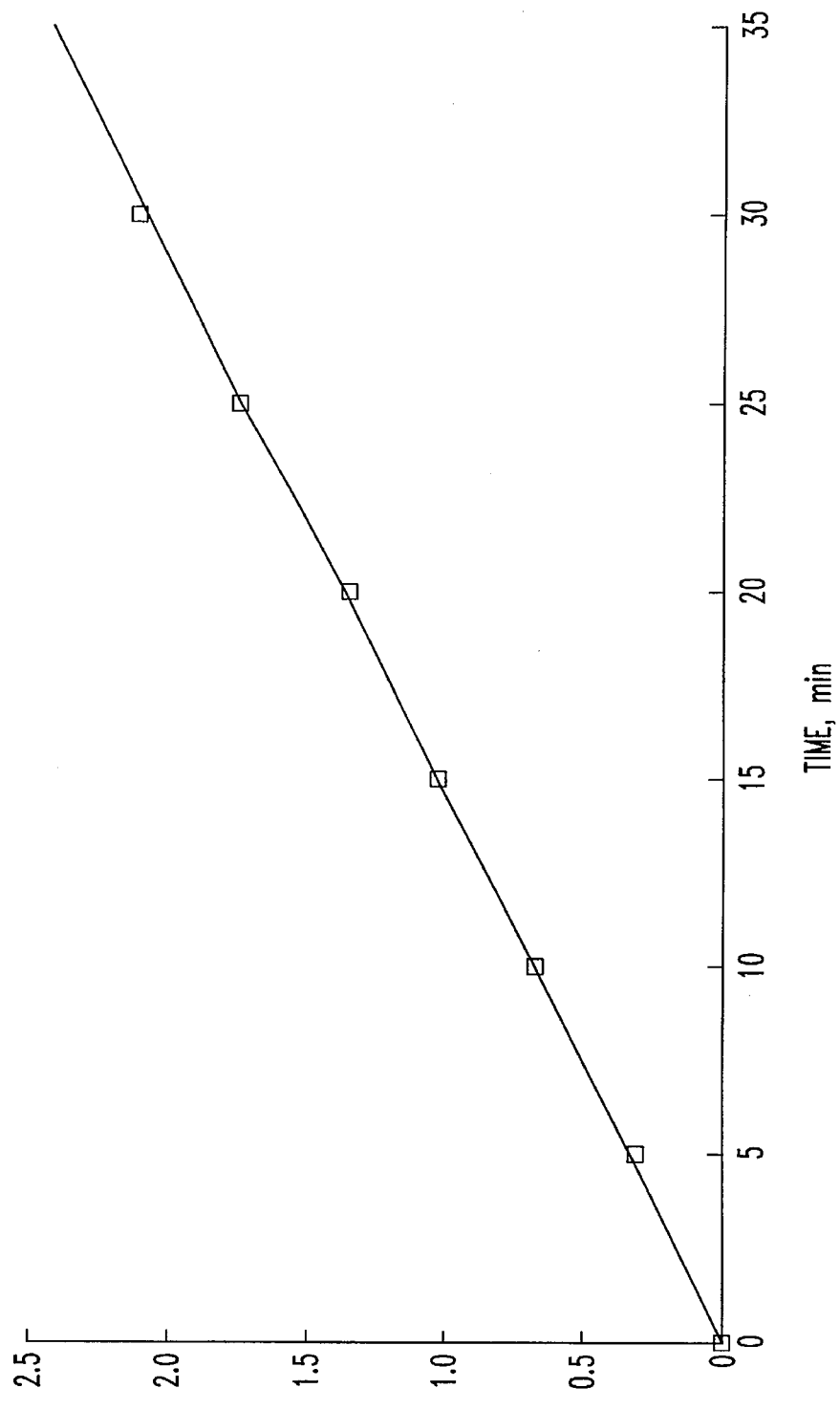
FIG. 3 is a plot of gold dissolved vs. time for rotating disk kinetic tests of the dissolution of gold in the concentrates of Example 6 herein.
Figure 4:
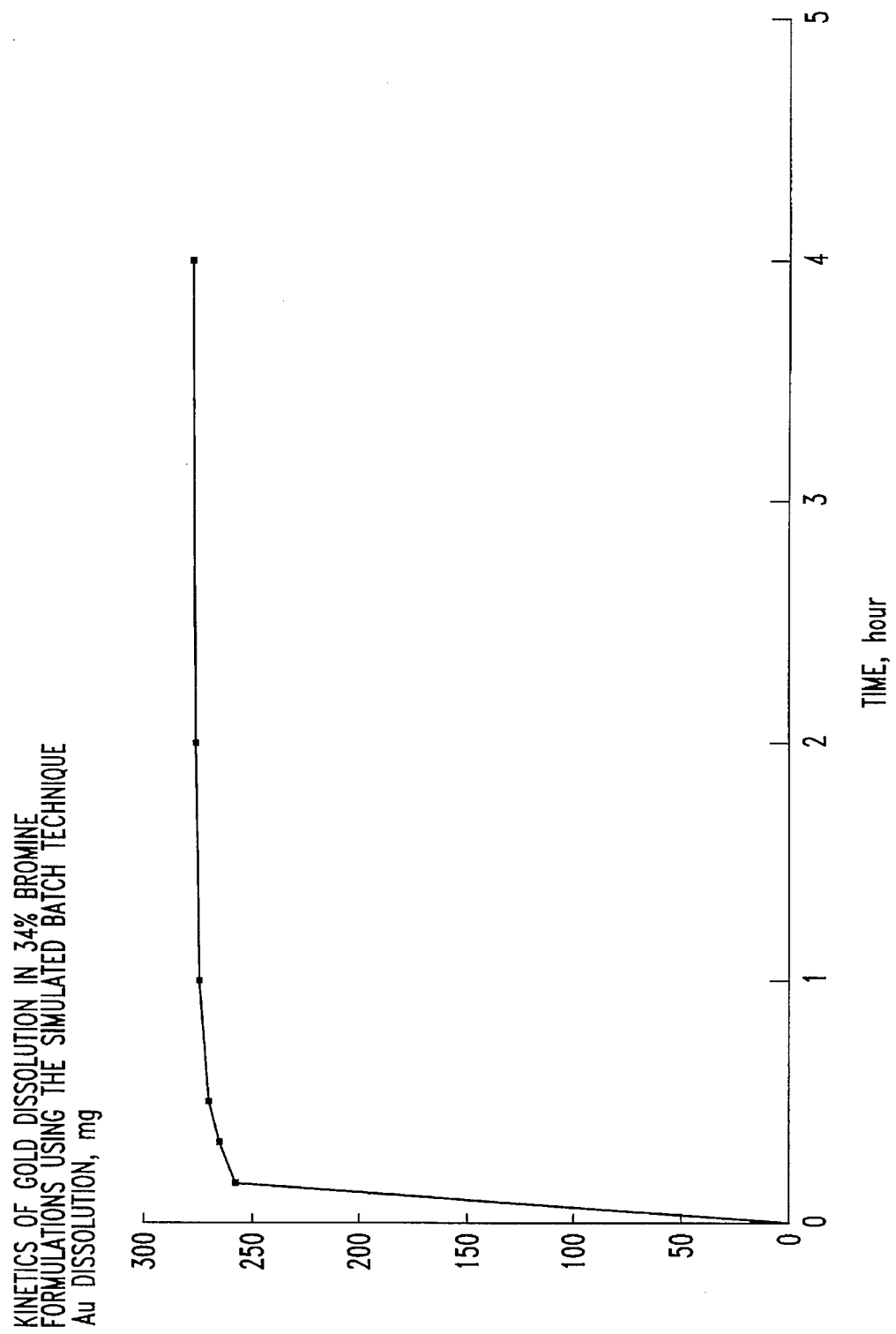
FIG. 4 is a plot of amount of gold dissolved vs. time for simulated batch kinetic tests of the dissolution of gold in the concentrates of Example 6 herein.

The results of the simulated batch kinetic studies are illustrated in FIG. 3, while the results of the rotating disk studies are shown in FIG. 4.

EXAMPLE 5

The effect of organic solvent additions was evaluated; acidic bromine concentrates were prepared having the compositions set forth in Table 6. Measurements were made of $Br_2$ partial pressure and other parameters. These are also set forth in Table 6. The compositions of this table are effective for precious metal recovery and industrial water treatment.

TABLE 6

| Organic Solvent | — | Acetic Acid | Propionic Acid |
|---|---|---|---|
| Wt. % $H_2O$ (from 48% HBr) | 33.8 | 19.3 | 19.3 |
| Wt. % 48% HBr | 65.0 | 37.0 | 37.0 |
| Wt. % Organic Solvent | — | 28.0 | 28.0 |
| Wt. % $Br_2$ (experimental) | 36.5 | 36.8 | 36.6 |
| pH | <0 | <0 | <0 |
| $Br_2$ Partial Pressure (mm Hg at 20° C.) | 39.0 | 20.0 | 17.0 |
| Density (g/mL) | 1.87 | 1.64 | 1.60 |
| Crystallization Temp (°C.) | −45 | <−50 | −42 |

EXAMPLE 6

A solution was prepared by dissolving sodium bromide (27.7 grams) in water (29.3 grams). A sodium perbromide solution was prepared by adding liquid bromine in an amount (43.0 grams) sufficient to saturate the bromide ion, i.e., stoichiometrically equivalent to the initial bromide ion content, in the solution. The resulting sodium perbromide component solution contained 43% equivalent molecular bromine.

A sodium hydroxide solution was prepared containing 16.7% by weight sodium hydroxide. Liquid bromine (25.0 grams) was added to this solution (75.0 grams) producing a composition which contained 6.7% by weight bromate ion (7.9% by weight as sodium bromate; 25% by weight equivalent molecular bromine). A concentrate was prepared by mixing equal parts by weight of the perbromide and bromate component solutions. The concentrate so prepared contained 31.82% by weight sodium perbromide, 2.14% by weight bromine, 14.80% by weight sodium bromide, 3.94% by weight sodium bromate and 47.30% by weight water. It had an equivalent molecular bromine concentration of 34% by weight.

The bromine concentrations of both the precursor concentrate and the sodium perbromide component solution were confirmed by adding to the respective solutions an excess of potassium iodide and then titrating the iodine released with sodium thiosulfate using starch as an indicator. Titration of the total equivalent molecular bromine content of the concentrate was effected by the addition of a strong mineral acid to convert the bromate content to $Br_2$. The concentrate was also titrated without addition of acid in order to determine the actual bromine concentration in terms of molecular bromine and perbromide ion. This titration showed 21.5% bromine in the concentrate.

Using the Isoteniscope method, the total vapor pressure was measured as a function of temperature for liquid $Br_2$, the sodium perbromide component solution of this example, and the precursor concentrate of this example. From the data obtained, the corresponding enthalpies of vaporization were calculated. The results of these measurements and calculations are set forth in Table 7.

TABLE 7

| | Vapor Pressure Data | | |
|---|---|---|---|
| | Vapor Pressure/mm Hg | | |
| °C. | $Br_2^a$ | $NaBr_3^b$ | Concentrate$^c$ |
| 0 | 75.0 | 44.0 | 23.0 |
| 5 | 95.5 | 56.0 | 30.5 |
| 10 | 120.5 | 68.0 | 38.0 |
| 15 | 151.0 | 86.0 | 48.0 |
| 20 | 189.0 | 108.5 | 60.0 |
| 25 | 234.0 | 138.0 | 69.0 |
| 30 | 289.0 | 173.0 | 86.0 |
| 35 | 357.5 | 214.0 | 112.5 |

$^a WH_v = 7.29$ Kcal mole$^{-1}$
$^b WH_v = 7.65$ Kcal mole$^{-1}$
$^c WH_v = 7.36$ Kcal mole$^{-1}$

EXAMPLE 7

Sodium perbromide and sodium bromate component solutions were prepared in the manner described in Example 6. A series of concentrates was prepared using varying proportions of the two component solutions. The composition of the concentrates obtained are set forth in Table 8.

TABLE 8

| Weight Fract. Perbromide Solution | Weight Fract. Bromate Solution | $NaBr_3$ Wt. % | $Br_2$ Wt. % | $NaBrO_3$ Wt. % | NaBr Wt. % | Density (g/cc) | pH | Eq. $Br_2$ conc. |
|---|---|---|---|---|---|---|---|---|
| 1 | 0 | 63.64 | 4.28 | — | 2.76 | 2.029 | 1.9 | * |
| 0.8 | 0.2 | 50.91 | 3.42 | 1.58 | 7.55 | 1.826 | 5.6 | 39.4 |
| 0.5 | 0.5 | 31.82 | 2.14 | 3.94 | 14.80 | 1.612 | 6.7 | 34 |
| 0.2 | 0.8 | 12.73 | 0.86 | 6.30 | 22.02 | 1.444 | 7.2 | 28.6 |
| 0 | 1.0 | — | — | 7.87 | 26.83 | 1.345 | 8.0 | * |

*not computed

EXAMPLE 8

In order to compare the vapor pressure of solutions containing bromate ion prepared according to the invention with previously known aqueous bromine-based solutions, a solution was prepared by a formulation method comparable to Bahl, et al. U.S. Pat. No. 4,190,489, and a composition was prepared according to the invention, each containing 34% by weight equivalent bromine. For the Bahl et al. formulation, 26 g KBr was dissolved in 40 g water and then 34 g $Br_2$ was added to the resulting solution. For the composition prepared according to the invention, 14.26 g NaBr, 45.49 g $H_2O$, 6.25 g NaOH and 34 g $Br_2$ were mixed. Bromate content and vapor pressure were calculated as follows: Titration with Thiosulfate-KI using a weak acid determines actual $Br_2$ content ($Br_2+Br_3^-$) while titration with Thiosulfate-KI using a strong acid converts bromate to bromine and determines the sum of bromate and bromine concentration. Therefore, the bromate content of the two solutions was determined by Thiosulfate-KI titration first with acetic acid to determine the actual bromine concentration, and then by Thiosulfate-KI titration with $H_2SO_4$ to determine the total equivalent molecular bromine ($Br_2+Br_3^-$ $+BrO_3^-$) and subtracting the difference. Solution vapor pressure at 25° C. was obtained by using the Isoteniscope method. The results obtained are set forth in Table 9.

TABLE 9

| pH, $Br_2$ Concentration, and Vapor Pressure Measurements: Composition A of the invention * vs. Bahl Formulation** | | |
|---|---|---|
| Parameter | A | Bahl Formulation |
| pH | 6.6 | 3.0 |
| Wt. % $Br_2$ (with Acetic acid) | 24.2 | 33.1 |
| Wt. % $Br_2$ (with $H_2SO_4$) | 32.5 | 33.4 |
| Wt. % $Br_2$ (present as $BrO_3^-$) | 8.3 | 0.3 |
| Vapor Pressure at 25° C. mm-Hg | 70.5 | 106 |

*14.26 g NaBr, 45.49 g $H_2O$, 6.25 g NaOH, 34 g $Br_2$.
**26 g KBr, 40 g $H_2O$, 34 g $Br_2$.

EXAMPLE 9

The four concentrates of Example 4 were tested as reagents for recovery of gold from a refractory gold concentrate sample. The conditions and results of these tests are set forth in Tables 10–13.

TABLE 10

| Leaching of Refractory Concentrate | |
|---|---|
| Sample Size: | 50.00 g Calcine |
| Fire Assay (Calcine): | 17.3 oz/t Au |
| Feed Preparation: | –100 mesh; roasted at 700° C. |
| Conditions: | 22° C.; pH = 5; 20.0% solids; 4 hours mixing; ORP = 930 mv |
| Lixiviant: | 1.0 g Formula #28 in 200 mL water |
| Metallurgical Balance | |
| Calcine to leach 50.00 g | 17.3 oz/t Au (29.64 mg) |
| Filtrate 650 mL | 43.17 mg/L Au (28.06 mg) |
| Residue 47.9 g | 1.11 oz/t Au (1.82 mg) |
| Au Solubilized | 93.91% |

TABLE 11

Leaching of Refractory Concentrate

| | |
|---|---|
| Sample Size: | 50.00 g Calcine |
| Fire assay (Calcine): | 17.3 oz/t Au |
| Feed Preparation: | −100 mesh; roasted at 700° C. |
| Conditions: | 22° C.; pH = 5; 20.0% solids; 4 hours mixing; ORP = 930 mv |
| Lixiviant: | 1.0 g Formula #29 in 200 mL water |

Metallurgical Balance

| | |
|---|---|
| Calcine to Leach 50.00 g | 17.3 oz/t Au (29.64 mg) |
| Filtrate 650 mL | 44.62 mg/L Au (29.00 mg) |
| Residue 44.4 g | 1.19 oz/t Au (1.96 mg) |
| Au Solubilized | 93.67% |

TABLE 12

Leaching of Refractory Concentrate

| | |
|---|---|
| Sample Size: | 50.00 g Calcine |
| Fire Assay (Calcine): | 17.3 oz/t Au |
| Feed Preparation: | −100 mesh; roasted at 700° C. |
| Conditions: | 22° C.; pH = 5; 20.0% solids; 4 hours mixing; ORP = 930 mv |
| Lixiviant: | 1.0 g Formula #30 in 200 mL water |

Metallurgical Balance

| | |
|---|---|
| Calcine to leach 50.00 g | 17.3 oz/t Au (29.64 mg) |
| Filtrate 650 mL | 46.04 mg/L Au (29.93 mg) |
| Residue 47.95 g | 1.00 oz/t Au (1.64 mg) |
| Au Solubilized | 94.81% |

TABLE 13

Leaching of Refractory concentrate

| | |
|---|---|
| Sample Size: | 50.00 g Calcine |
| Fire assay (Calcine): | 17.3 oz/t Au |
| Feed Preparation: | −100 mesh; roasted at 700° C. |
| Conditions: | 22° C.; pH = 5; 20.0% solids; 4 hours mixing; ORP = 930 mv |
| Lixiviant: | 1.0 g Formula #31 in 200 mL water |

Metallurgical Balance

| | |
|---|---|
| Calcine to Leach 50.00 g | 17.3 oz/t Au (29.64 mg) |
| Filtrate 492.65 mL | 63.14 mg/L Au (31.11 mg) |
| Residue 44.4 g | 0.695 oz/t Au (1.06 mg) |
| Au Solubilized | 96.7% |

EXAMPLE 10

Using the method generally described in Example 1, a concentrate was prepared having the formulation of Composition #31 of Table 5 (Example 4). The effectiveness of this composition for recovery of gold from ore was tested using a rotating disk technique, and also using the simulated batch technique as generally described in Example 4.

The rotating disk test was conducted using a Pine Instrument model AFASR Rotator having a gold disk electrode. The parameters of the experiment were:

| | |
|---|---|
| Temperature: | 25° C. |
| Rotation rate: | 500 rpm |
| Volume of sample: | 200 mL |
| Electrode area: | 0.203 cm² |
| Perbromide concentration: | 5 g/L |
| pH: | 3.2 |

The rotating disk experiment was initiated by the introduction of the gold disk electrode, while rotating, into the solution. Samples of the solution were withdrawn at 5 minute intervals for gold analysis, pH and temperature being recorded.

In the simulated batch kinetic experiments, samples were withdrawn at intervals of 0.16, 0.33, 0.5, 1, 2, 4, 8 and 24 hours.

In both experiments, the volume was maintained constant by additions of deionized water to compensate for sample withdrawal. All gold analyses were done by ICP (Inductively Coupled Plasma Spectrophotometer) using a Thermol Jarrell Ash Atomscan 25.

EXAMPLE 11

A leaching solution was prepared from the concentrate of Example 6 and used in leaching tests for recovery of gold and silver from a refractory ore concentrate initially containing 12.5% by weight carbon and 15.5% by weight sulfur. A fire assay of this ore performed by Chemex of Canada showed 7.07 oz. gold per ton and 6.39 oz. silver per ton. A similar fire assay provided by Hazen of the U.S. showed 6.61 oz. gold per ton and 5.83 oz. silver per ton. Because of the high concentration of carbon and sulfur in this ore, it was necessary to pretreat the ore prior to leaching. Pressure oxidation and roasting are among the commonly used methods for oxidizing carbon and sulfur in carbonaceous and refractory ores before the recovery of precious metals therefrom by leaching. In this instance, the ore was pretreated by roasting.

In the roasting operation, an ore concentrate (451 g) was charged into a 100 mm diameter quartz batch kiln. The kiln was placed in an electrically heated clamshell furnace sealed with rotary fittings at the ends, and rotated at about 5 rpm. Oxygen was passed through the kiln while the contents thereof were heated to a temperature ranging from 600°–707° C., averaging approximately 650° C. Temperature was controlled by application of electric power to heat and opening of the furnace to the surroundings for cooling. After the ore was heated in the presence of a stream of oxygen for 120 minutes, the kiln was cooled and the calcine products sampled and analyzed. A 22% weight loss occurred during roasting. The calcine contained 3% total sulfur and 8.5% sulfate, indicating that the residual sulfide level was 0.17%.

A series of leaching tests was carried out in which gold and silver were recovered from the calcine using an aqueous bromine leaching agent. To prepare the leaching agent, a portion of the concentrate of Example 6 (1.4 grams) and 48% hydrobromic acid (0.8 grams) were introduced into a small capped bottle. The contents were mixed well to assure conversion of sodium bromate to bromine. The mixture was then transferred into a 100 mL flask containing sodium bromide (1 g), and water was added up to the mark, i.e., to produce a total solution volume of 100 mL.

Calcine (22.75 grams; one assay ton equivalent of dried unroasted concentrate) and the aqueous bromine leaching solution from the volumetric flask (100 ml.) were placed in a capped 250 mL Erlenmeyer flask. The resultant slurry was mixed using an automatic mixer for a predetermined period of time at room temperature. Individual runs were made in which mixing was terminated after 4, 8, 12 and 24 hours, respectively. After termination of the mixing cycle, the slurry was filtered and the residue washed with 4M hydrochloric acid. Head filtrate and wash solution were combined and analyzed for gold and silver. The results are presented in Table 14. The data for percent extraction in this table are based on the concentrations of silver and gold in the solution and the average assay values of Hazen and Chemex.

TABLE 14

LEACHING OF REFRACTORY CONCENTRATE

| Sample Size: | 22.75 g Calcine or 29.16 g unroasted |
| --- | --- |
| Fire Assay: | 6.84 oz/t Au; 6.11 oz/t Ag (unroasted ore) |
| Feed Preparation: | 325 mesh, roasted at 650° C. |
| Conditions: | 22° C., pH = 5.0–5.5, 18.5% solids |

| | Leach Time | Solution Au | Ag | % Extraction | |
| --- | --- | --- | --- | --- | --- |
| Test No. | Hour | oz/t | oz/t | Au | Ag |
| 1 | 4 | 7.10 | 3.98 | 100 | 65 |
| 2 | 8 | 7.13 | 4.13 | 100 | 68 |
| 3 | 12 | 6.86 | 4.54 | 100 | 74 |
| 4 | 24 | 7.00 | 4.33 | 100 | 70 |

EXAMPLE 12

In order to optimize the concentration of active agents needed to leach gold from a refractory concentrate, a series of leaching tests was carried out under conditions comparable to those of Example 11 but at varying dilutions of the concentrate. No pH adjustment was made in the tests of this example. The slurry of calcine and aqueous bromine reagent was mixed for 4 hours and filtered. The filter cake was washed and the gold value of the combined filtrate and wash solution was measured. The results of the experimental runs of this example are set forth in Table 15, each test result reported in this table being based on the average of 3 runs. Note that 44 pounds of the concentrate or 15 pounds of bromine equivalent was found necessary to leach about 7 oz. of gold from 1 ton of refractory concentrate ore.

TABLE 15

LEACHING OF REFRACTORY CONCENTRATE

| Sample Size: | 22.75 g calcine or 29.16 g unroasted |
| --- | --- |
| Fire assay: | 6.84 oz/t Au; 6.11 oz/t Ag (unroasted ore) |
| Feed Preparation: | 325 mesh; roasted at 650° C. |
| Conditions: | 22° C.; pH = 5.0–6.5; 18.5% solids 4 hrs. mixing |

| Test No. | Usage of Conc.* lb/t ore | Au oz/t | Extraction % |
| --- | --- | --- | --- |
| 1 | 123 | 6.86 | 100 |
| 2 | 88 | 6.94 | 100 |
| 3 | 44 | 6.85 | 100 |

*Concentration of reagent of Example 6 per ton of ore in leaching slurry.

EXAMPLE 13

To study the effect of NaBr concentration on the leaching of Au and Ag from a refractory concentrate, a series of leaching tests was carried out. The tests were similar to those of Example 11, but the concentration of NaBr was varied. The aqueous bromine leaching solution contained 1 wt. % concentrate of Example 6 and varying amounts of NaBr. The residue was washed with water instead of 4M HCl. The results are presented in Table 16. Considering the fire assay of head ore (Hazen) as the basis, the gold recovery ranged from 96% to 100% and silver recovery range was about 2–13%. It is interesting to note that the addition of NaBr does not have any effect on the Au recovery, whereas the recovery of Ag is affected by the concentration of NaBr. Comparing the Ag recovery in these leaching tests with those of Example 11, it may be concluded that washing the residue with 4M HCl definitely improves the Ag recovery without having any effect on the Au recovery. The residues of the leaching tests (Table 16) were fire assayed by Hazen. Set forth in Table 17 are the metallurgical balance and the calculated percentage of gold solubilized on the basis of the calculated head.

TABLE 16

LEACHING OF REFRACTORY CONCENTRATE

| Sample Size: | 50.00 g Calcine |
| --- | --- |
| Fire assay: (Calcine) | 8.52 oz/t Au; 6.60 oz/t Ag |
| Feed Preparation: | 325 mesh; roasted at 650° C. |
| Conditions: | 22° C.; pH = 5.0–6.5; 20.0% solids 4 hrs. mixing |

| | NaBr | Solution Au | Ag | % Extraction | |
| --- | --- | --- | --- | --- | --- |
| Test No. | Wt. % | oz/t | oz/t | Au | Ag |
| 1 | 0 | 8.77 | 0.12 | 100 | 1.8 |
| 2 | 2.5 | 8.44 | 0.17 | 99 | 2.6 |
| 3 | 5.0 | 8.27 | 0.60 | 97 | 9.1 |
| 4 | 10.0 | 8.18 | 0.85 | 96 | 12.9 |
| 5 | 20.0 | 8.97 | 0.73 | 100 | 11.1 |

TABLE 17

LEACHING OF REFRACTORY CONCENTRATE METALLURGICAL BALANCE

| Sample Size: | 50.00 g Calcine |
| --- | --- |
| Fire assay: | 8.52 oz/t Au (14.62 mg Au) |
| Feed Preparation: | 325 mesh; roasted at 650° C. |
| Conditions: | 22° C., pH - 5.0–6.5; 20.0% solids, 4 hrs. mixing |

| Run No. | 1 | 2 | 3 | 4 | 5 |
| --- | --- | --- | --- | --- | --- |
| Filtrate | | | | | |
| Volume, ml | 370 | 360 | 294 | 302 | 486 |
| Au Conc., mg/L | 40.9 | 40.8 | 47.0 | 46.3 | 31.8 |
| Au Conc., mg | 15.13 | 14.69 | 13.82 | 13.98 | 15.46 |
| Residue | | | | | |
| Au Conc., oz/t | 0.372 | 0.322 | 0.186 | 0.276 | 0.342 |
| Au Conc., mg | 0.64 | 0.55 | 0.32 | 0.47 | 0.58 |
| Au Solubilized, % | 96.0 | 96.4 | 97.8 | 96.7 | 96.4 |
| Calculated Head oz/t | 9.19 | 8.88 | 8.24 | 8.42 | 9.35 |
| Overall Balance, % | 104 | 97 | 99 | 109 | 108 |

EXAMPLE 14

A series of leaching tests was carried out in which gold and silver were recovered from a low grade clean ore using an aqueous bromine leaching agent. The procedure of Example 11 was followed. The leaching solution contained 0.5 wt. % of the concentrate of Example 6 and 1 wt. % NaBr. The residue was washed with 4M HCl. The head filtrate and wash solution were analyzed for Au and Ag to obtain the solubilized metals. The results are presented in Table 18. Considering the fire assay of head ore (Hazen) as the basis, the gold recovery was 100%. The silver recovery ranged between 50–100%.

TABLE 18

LEACHING OF LOW GRADE CLEAN ORE

Sample Size: 29.16 g ore
Fire Assay: 0.148 oz/t Au; 1.99 oz/t Ag
Feed Preparation: 200 mesh
Conditions: 22° C.; pH = 5.0–6.5; 23% solids

| Test No. | Leach Time Hour | Solution Au oz/t | Ag oz/t | % Extraction Au | Ag |
|---|---|---|---|---|---|
| 1 | 4 | 0.148 | 2.35 | 100 | 100 |
| 2 | 4 | 0.150 | 2.30 | 100 | 100 |
| 3 | 4 | 0.166 | 1.00 | 100 | 50 |
| 4 | 4 | 0.146 | 1.10 | 99 | 55 |
| 5 | 4 | 0.167 | 1.02 | 100 | 51 |
| 6 | 4 | 0.177 | 2.30 | 100 | 100 |
| 7 | 4 | 0.195 | 2.30 | 100 | 100 |

EXAMPLE 15

In a further series of leaching tests using the concentrate of Example 6, the concentration of concentrate in the leaching solution was varied from 2.0 to 6.0 g/L. These tests indicated that gold recovery was maximized at about 4.0 g/L concentrate.

Further tests were conducted at leaching times of 2, 4, 6, 12, 18 and 24 hours. The results of these tests indicated that over 98% of all leachable gold was solubilized after 2 hours. Based on the results of the latter tests a leaching time of 6 hours was chosen for further tests.

Triplicate confirmatory tests were conducted on two separate ore calcines that had been obtained by roasting samples of Canadian flotation concentrate at 650° C.–750° C. The confirmatory tests were conducted using what were considered generally optimum conditions: 4 g/L concentrate, pH 5.0–6.0, and leaching time 6 hours. In the tests on the first calcine, gold in the residue ranged from 0.592 to 0.650 oz/t, Au recovery ranged from 94.2% to 94.5% and Au Head was calculated as ranging from 9.51 to 9.96 oz/t. In the tests on the second calcine, the corresponding figures were 0.714 to 0.768 oz/t Au in residue, 96.0 to 96.3% Au extraction, and 17.29 to 17.73 oz/t Au Head.

EXAMPLE 16

A solubilizing reagent having the composition of that prepared in accordance with Example 4, composition #31 (using 46% NaBr) (hereinafter the "PGM Reagent") was used to demonstrate the ability of the present composition to solubilize palladium. Samples of a precious metal scrap, comprising a hydrocracking catalyst (estimated 0.5% Pd) were used in the following tests to evaluate the effect of pH, pH adjuster, time, bromide concentration, reagent source, temperature and mixing speed.

pH/pH Adjuster

The suitability of various acids was studied for adjustment of pH in order to achieve the very low pH (<0) found to be particularly advantageous for palladium recovery. These tests involved the dissolution of 2.5 g catalyst in 5 g PGM Reagent and 100 g $H_2O$. The results are set forth in Table 19. The various acids tested were shown to be useful for pH adjustment. Sulfuric acid provided for the greatest palladium recovery, but also digested the largest amount of substrate. Sulfuric acid was chosen as the pH adjuster for subsequent tests.

TABLE 19

| | 10 g 48% HBr | 10 g 38% HCl | 10 g 94% $H_2SO_4$ |
|---|---|---|---|
| pH | 0.24 | <0 | <0 |
| ORP (mV) | 848 | 900 | 897 |
| % residue left | 86 | 69 | 54 |
| State of residue | powder | solid/powder | powder |
| Wt % Pd in soln | 0.239 | 0.281 | 0.353 |
| Oz/ton in soln | 70.07 | 82.04 | 103.06 |

Dissolution Time

Duplicate tests were conducted to demonstrate the effect of reaction time for recovery of Pd from the catalyst. 2.5 g catalyst was dissolved in a solution containing 5 g PGM Reagent, 10 g conc. $H_2SO_4$ and 100 g $H_2O$ at 85° C. with a shaker bath mixing speed of 280 rpm. The results of these tests are shown in Table 20. A graph with the best fitting curve of the oz/ton Pd in solution vs. time peaks at approximately 10–14 hours. Due to the time limitations of a workday, 10 hours was chosen as the optimum reaction time for further studies.

TABLE 20

| | 1 hr | 2 hrs | 4 hrs | 8 hrs | 15 hrs | 24 hrs |
|---|---|---|---|---|---|---|
| pH | <0 | <0 | <0 | <0 | 0.07 | >0 |
| ORP (mV) | 895 | 889 | 897 | 907 | 890 | 850 |
| % residue left | 85 | 79 | 54 | 47 | 49 | 45 |
| State of residue | rods | rods | dust | dust | dust | dust |
| Wt % Pd in soln | 0.249 | 0.273 | 0.353 | 0.365 | 0.373 | 0.340 |
| Oz/ton in soln | 72.70 | 78.20 | 103.1 | 106.6 | 108.9 | 99.27 |

Bromide Concentration

The bromide concentration variable was controlled by using 46% NaBr. 2.5 g catalyst was contacted with a solution of 5 g PGM Reagent, 10 g conc. $H_2SO_4$ and 100 g $H_2O$ for 10 hrs at 85° C. with a shaker bath mixing speed of 280 rpm. The results of this set of tests, provided in Table 21, show that NaBr in addition to that provided by the PGM reagent did not improve palladium dissolution.

TABLE 21

| Wt. 46% NaBr | 0 g | 3 g | 5 g | 10 g | 20 g |
|---|---|---|---|---|---|
| pH | 0.14 | 0.13 | 0.12 | 0.10 | 0.15 |
| ORP (mV) | 885 | 878 | 868 | 851 | 833 |
| % residue left | 51 | 51 | 55 | 52 | 53 |
| State of residue | dust | dust | dust | dust | dust |
| Wt % Pd in soln | 0.350 | 0.348 | 0.331 | 0.337 | 0.334 |
| Oz/ton in soln | 102.2 | 101.6 | 96.64 | 98.39 | 97.52 |

Bromine Reagent

A further test was performed to evaluate the dissolution of palladium using bromine only as the reagent. For each of the tests described in Table 22, 2.5 g catalyst was contacted with a solution containing 10 g conc. $H_2SO_4$ and 100 g water for 10 hrs at 85° C. with a shaker bath mixing speed of 280 rpm. As shown in Table 22, the PGM Reagent performed better than the equivalent amount of bromine in water.

TABLE 22

|  | 1.7 g Br$_2$ + 98.3 g H$_2$O | 5 g PGM Reagent |
| --- | --- | --- |
| pH | 0.29 | 0.14 |
| ORP (mV) | 954 | 885 |
| % residue left | 50 | 51 |
| State of residue | dust | dust |
| Wt % Pd in soln | 0.300 | 0.350 |
| Oz/ton in soln | 87.59 | 102.19 |

Temperature

It has been found that effective leaching of palladium and platinum can be achieved at temperatures in the range of 80°–90° C. Tests were conducted to assess leaching effectiveness at lower temperatures in recovery of Pd from spent catalyst. 2.5 g catalyst was contacted with a solution containing 5 g PGM Reagent, 10 g conc. H$_2$SO$_4$ and 100 g H$_2$O for 10 hrs at a shaker bath mixing speed of 280 rpm. The results are given in Table 23. The recovery reported in these tests was not as good as had been demonstrated at 80° C.–90° C. Lower temperatures helped to preserve the substrate, but lowered the palladium recovered in solution. For the recovery of Pd from this scrap, 85° C. was chosen as the optimum temperature.

TABLE 23

|  | 65° C. | 45° C. | 25° C. |
| --- | --- | --- | --- |
| pH | 0.13 | 0.09 | 0.05 |
| ORP (mV) | 895 | 901 | 905 |
| % residue left | 73 | 94 | approx. 100 |
| State of residue | solid | solid | solid |
| Wt % Pd in soln | 0.303 | 0.234 | 0.202 |
| Oz/ton in soln | 88.32 | 68.61 | 59.98 |

Mixing Speed

The effect on dissolution of the the mixing speed of the shaker bath was studied. In earlier tests mixing was carried out at the highest mixing speed (280 rpm) that would allow the reaction flasks to remain securely positioned. In these tests, at lower speeds, 2.5 g catalyst was contacted with a solution containing 5 g PGM Reagent, 10 g conc. H$_2$SO$_4$ and 100 g H$_2$O for 10 hrs at 85° C. As shown in Table 24, the 100 rpm setting was surprisingly better for palladium dissolution than the 200 rpm setting. Also, the 100 rpm mixing speed performed just as well, if not better, than the speed (280) of the other tests.

TABLE 24

|  | 200 RPM | 100 RPM |
| --- | --- | --- |
| pH | 0.20 | 0.14 |
| ORP (mV) | 888 | 832 |
| % residue left | 53 | 49 |
| State of residue | dust | dust/solid |
| Wt % Pd in soln | 0.352 | 0.382 |
| Oz/ton in soln | 102.63 | 111.34 |

Three confirmatory tests, using the 100 rpm setting, were performed. The palladium in solution ranged from 104 to 116 oz/ton, averaging 109.9 oz/ton. The tailings of all three confirmatory tests plus the original, duplicate tests of the 100 rpm setting were placed in aqua regia refluxes. An average of 9.46 oz/ton Pd remained in the five residues. From these results, a mass balance showed that the average percent of palladium solubilized by the PGM Reagent was 92.11%.

EXAMPLE 17

A refractory concentrate containing platinum, palladium, rhodium and gold was used (after roasting overnight at 800° C.) in this example to evaluate the efficacy of the inventive compositions for solubilizing gold, platinum, and palladium. The analysis of this concentrate by Hazen Research Laboratories was 50.6 oz/ton Pd, 15.6 oz/ton Pt, 0.83 oz/ton Au, and 0.44 oz/ton Rh. Due to the high sulfur content, roasting of the concentrate was deemed necessary, and several tests were performed on the calcine concentrate. The variables studied included PGM Reagent concentration, reaction time, preleaching, pH adjuster, method of agitation, and acid concentration.

PGM Reagent Concentration

Three concentrations of PGM Reagent were tested. 10 g of calcine concentrate was dissolved in a solution containing varying amounts of PGM Reagent, 10 g conc. H$_2$SO$_4$ and 100 g H$_2$O for 16 hrs at 85° C. and at a mixing speed of 200 rpm. The results are shown in Table 25. Based on these tests, 5 g or 5% PGM Reagent was selected as the optimum concentration for the remaining tests. Rh was not detectable by ICP analysis throughout all tests.

TABLE 25

|  | 2.5 g PGM Reagent | 5.0 g PGM Reagent | 10 g PGM Reagent |
| --- | --- | --- | --- |
| pH | <0 | <0 | <0 |
| ORP (mV) | 897 | 891 | 881 |
| Pd ox/ton soln. | 24.6 | 27.1 | 24.2 |
| Pt oz/ton soln. | 6.71 | 7.84 | 6.84 |
| Au oz/ton soln. | * | 0.74 | * |

Reaction Time 10 g calcine was dissolved in a solution containing 10 g conc. H$_2$SO$_4$, 5 g PGM Reagent and 100 g H$_2$O at 85° C. and at a mixing speed of 200 rpm. The results shown in Table 26 indicate a palladium peak at six hours, but also a platinum peak at sixteen hours (or overnight). Both of these reaction times were used interchangeably in subsequent testing.

TABLE 26

|  | 1 hr | 2 hrs | 4 hrs | 6 hrs | 8 hrs | 16 hrs | 24 hrs |
| --- | --- | --- | --- | --- | --- | --- | --- |
| pH | <0 | <0 | <0 | <0 | <0 | <0 | <0 |
| ORP (mV) | 910 | 906 | 902 | 891 | 895 | 886 | 876 |
| Pd oz/t | 17.4 | 16.2 | 18.6 | 27.1 | 19.2 | 22.7 | 24.7 |
| Pt oz/t | 6.44 | 6.17 | 9.51 | 7.84 | 8.75 | 12.2 | 6.88 |
| Au oz/t | * | * | 0.57 | 0.74 | * | 0.46 | * |

Preleaching

Because a high concentration of base metals was thought to be inhibiting platinum and palladium dissolution, the effect of acid preleaching to remove these metals, followed by bromine leaching, was studied. The two preleaches compared were a 20% $H_2SO_4$ preleach to a 10% $H_2SO_4$/24% HBr preleach. Each was followed by a 5% PGM Reagent bromine leach. 10 g ore was preleached in 20 g conc. $H_2SO_4$ and 80 g $H_2O$ for 3 hrs at room temperature. 10 g ore was also preleached in a solution containing 10 g conc. $H_2SO_4$, 50 g 48% HBr and 50 g $H_2O$ for 16 hrs at 85° C. After preleaching, each sample was leached in a solution containing 5 g PGM Reagent, 10 g conc. $H_2SO_4$ and 100 g $H_2O$ at 85° C. and a shaker bath mixing speed of 200 rpm. As shown in Table 27, the 20% sulfuric acid preleach helped palladium dissolution, but not platinum. The bromine leach following the HBr/$H_2SO_4$ preleach improved the platinum dissolution only slightly.

TABLE 27

|  | $H_2SO_4$ pre | $Br_2$ leach | HBr/$H_2SO_4$ pre | $Br_2$ leach |
| --- | --- | --- | --- | --- |
| pH | <0 | <0 | <0 | <0 |
| ORP (mV) | N.A. | 874 | N.A. | 989 |
| Pd oz/ton | N.D. | 31.3 | 37.9 | N.D. |
| Pt oz/ton | N.D. | 6.40 | 4.78 | 1.36 |
| Au oz/ton | N.D. | * | * | * | pH Adjuster

It was known from prior work that very low pH (<0) was preferred for dissolution of Pt and Pd. The effect of different acids for pH adjustment in the dissolution of this concentrate was studied. 10 g ore was slurried in a solution containing 5 g PGM Reagent and 100 g $H_2O$ for 16 hrs at 85° C. and a shaker bath mixing speed of 200 rpm. As shown in Table 28, although the HBr and HCl leaches produced a higher concentration of palladium in solution, the $H_2SO_4$ leach produced a higher concentration of platinum in solution.

TABLE 28

|  | 10% HBr | 10% $H_2SO_4$ | 18% HCl |
| --- | --- | --- | --- |
| pH | <0 | <0 | <0 |
| ORP (mV) | 816 | 886 | 817 |
| Pd oz/ton soln | 32.3 | 29.8 | 34.2 |
| Pt oz/ton soln | 6.00 | 8.20 | 6.60 |
| Au oz/ton soln | * | 0.49 | * |

Method of Agitation

A stir plate and heating mantle apparatus was compared to the shaker bath method for agitating ore slurries. The $H_2SO_4$ concentration variable was tested simultaneously. 20 g ore was slurried in a solution containing 10 g PGM Reagent and 100 g $H_2O$ at 85° C. for 6 hrs using stir bars. The results of these tests are presented in Table 29.

TABLE 29

|  | 20% $H_2SO_4$ | 30% $H_2SO_4$ | 40% $H_2SO_4$ |
| --- | --- | --- | --- |
| pH | <0 | <0 | <0 |
| ORP (mV) | 825 | 804 | 774 |
| Pd oz/ton soln | 33.8 | 34.8 | 33.5 |
| Pt oz/ton soln | 9.42 | 7.10 | 8.89 |
| Au oz/ton soln | 0.25 | * | * |

Pt and Pd Recovery

Fire assay results were obtained and metallurgical balances calculated for the following three tests. The conditions were: LEACH-A: 10 g ore; 10 g conc. $H_2SO_4$; 5 g PGM Reagent; 90 g $H_2O$; 85° C. (shaker bath); and 16 hours. LEACH-B: 20 g ore; 40 g conc. $H_2SO_4$; 10 g PGM Reagent; 150 g $H_2O$; 85° C. (stir plate); and 16 hours. LEACH-C: Same as B, except time was only 6 hours. The results are presented in Table 30.

TABLE 30

|  | LEACH-A | LEACH-B | LEACH-C |
| --- | --- | --- | --- |
| Pd Solubilized | 63.13% | 69.36% | 78.41% |
| Pt Solubilized | 94.91% | 94.87% | 96.47% |
| Au Solubilized | 93.96% | 99.02% | 94.38% |

Following the above tests, it was determined that roasting at 750° C. may have left some of the Pd and Pt in sulfide form, meaning the roasting was incomplete. Therefore, new samples of the Pd/Pt ore were roasted at 900° C. and 1000° C. Weight losses were detected of 8.7% and 9.4%, respectively.

Duplicate tests were performed on both the 900° C. and 1000° C. roasted samples. 10 g calcine was dissolved in a solution containing 20 g conc. $H_2SO_4$, 5 g PGM Reagent and 90 g $H_2O$ at 85° C. for 6 hours using stir plate mixing. The results, set forth in Table 31, are averages of the duplicate tests. An increased roasting temperatures helped to increase the Pd dissolution slightly, although the Pt and Au were compromised. Further tests were performed on these samples to optimize the PGM Reagent and bromide concentrations. Lowering the PGM Reagent and compensating the bromide loss with HBr gave very poor results.

TABLE 31

|  | 900° C. | 1000° C. |
| --- | --- | --- |
| Pd Solubilized | 77.73% | 83.72% |
| Pt Solubilized | 83.08% | 84.48% |
| Au Solubilized | 98.18% | 71.89% |

EXAMPLE 18

As for the PGM Reagent used in the preceding Examples, the various other compositions of the present invention provide high levels of molecular bromine for dissolution of platinum and palladium. Repetition of the foregoing Examples 16 and 17 using each of the compositions of Examples 1–7 provides suitable platinum and palladium recoveries.

For certain of these processes, the initial PGM reagent includes water, at least about 25% by weight bromine, between about 4% and about 30% by weight hydrobromic acid, and between about 4% and about 15% by weight of lithium bromide, sodium bromide, potassium bromide or calcium bromide, a molar excess of bromide ion over bromine of at least about 30%, and a pH of not greater than about 1.0. This reagent is diluted with water to prepare the leaching solution, which is thereafter contacted with the Pt/Pd source.

For others of these processes, the initial PGM reagent includes a precursor composition initially having a pH of between about 6.5 and about 7.5 and comprising bromide ion, perbromide ion, molecular bromine, at least about 2% by weight bromate ion, and an alkali metal or alkaline earth metal ion, the precursor composition having an equivalent molecular bromine content of between about 10% and about 40% by weight and the ratio of the molar concentration of bromate ion to the sum of the molar concentrations of molecular bromine and perbromide ion being between about 0.05 and about 0.8. The precursor composition is acidified, producing a leaching solution having a pH of between about 0 and about 6 and containing between about 0.01% and about 20% by weight equivalent molecular bromine, between about 0.005% and about 20% by weight bromide ion, and between about 0.005% and about 30% by weight total halide ion, which leaching solution is then contacted with the PGM source.

EXAMPLE 19

Figure 5:
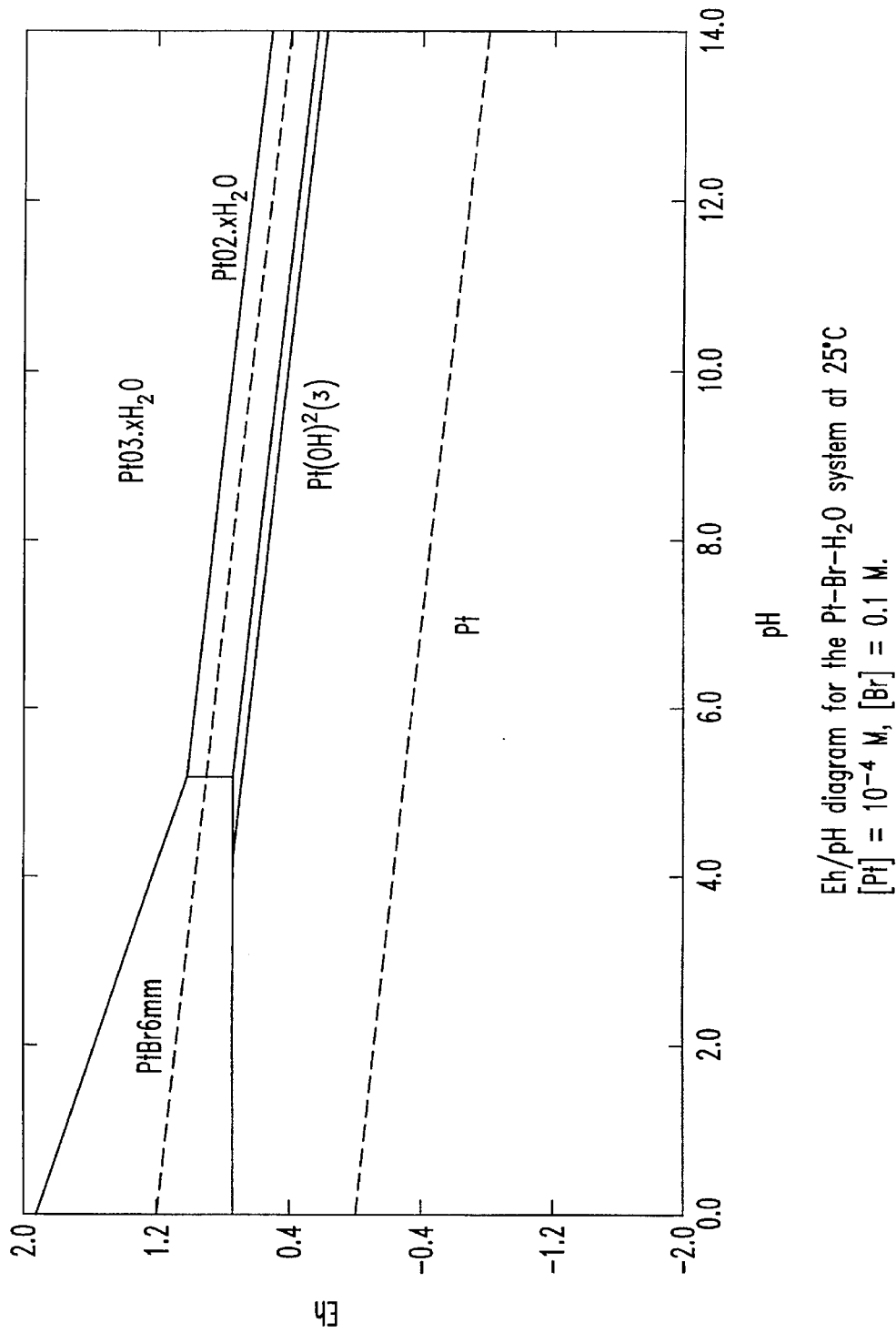
FIG. 5 is an Eh/pH diagram for the system $H_2O$-$10^{-4}M$ Pd-0.1M $Br^-$.
Figure 6:
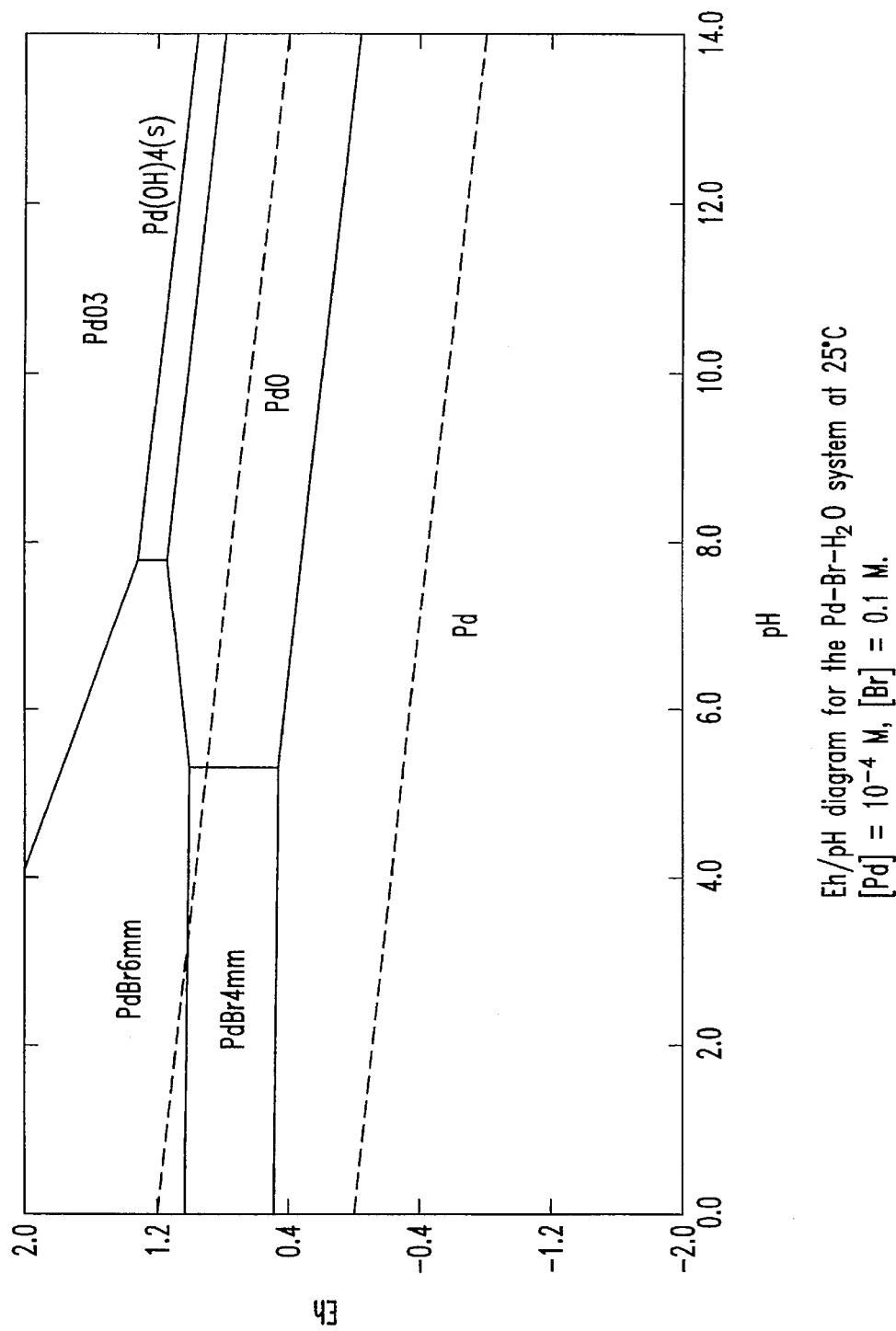
FIG. 6 is an Eh/pH diagram for the system $H_2O$-$10^{-4}M$ Pt-0.1M $Br^-$.

Referring to the FIGS. 5 and 6, there are shown Eh/pH diagrams for representative platinum group metals in the systems $H_2O$—$10^{-4}M$ Pd—0.1 $MBr^-$ (FIG. 5) and $H_2O$—$10^{-4}M$ Pt—0.1M $Br^-$ (FIG. 6). These diagrams are based on thermodynamic data for these metals in $Br$—$H_2O$ at 25° C. The diagrams show the regions of soluble and/or solid bromide complexes formed with platinum and palladium as a function of concentration of bromide and metal ion, applied potential, and pH.

EXAMPLE 20

A simulated barren solution was prepared having a composition typical of that which would be obtained after recovery of gold by ion exchange from a pregnant leach solution produced by bromine leaching. To this end, sodium bromide and 48% hydrobromic acid were mixed with water to produce a solution containing 5% by weight bromide ion and having a pH of 3. In a series of runs this solution was circulated at a flow rate of 125 L/sec. between a 300 gal. pilot scale reservoir for the solution and a Chloropac cell operated at a constant amperage of 100A. At this amperage, the Chloropac cell is rated to produce ½ lb. $Cl_2$ per hour. Velocity through the annular portion of the Chloropac cell between the electrodes was about 1.83 m/sec.

Measurements were made of current efficiency as a function of the conversion of bromide and the bromine content generated in the solution. The current efficiency decreased with conversion and bromine content, but the cumulative efficiency was still close to 80% at a bromine concentration of 56 mmol $dm^{-3}$ and a conversion of 11.5%.

EXAMPLE 21

Further electrolysis runs were conducted in the manner described in Example 20, except that the simulated barren solution was buffered with 6 mol $dm^{-1}$ sulfuric acid instead of 48% HBr. The results were essentially identical to those of Example 20. These results indicate that the depletion of $Br^-$ from the system has a negligible effect on current efficiency at low conversion. Loss in current efficiency with conversion in this low range can be substantially attributed to reduction of $Br_2$ to $Br^-$ at the cathode.

EXAMPLE 22–24

Runs were made according to the general procedure of Example 21 except that the concentration of $Br^-$ was varied. In Example 22 the concentration was 4%, in Example 23 it was 3%, and in Example 24 it was 2.5%. To maintain conductivity, the solutions of Examples 23 and 24 further contained sodium sulfate as an auxiliary electrolyte. In Example 23, the $Na_2SO_4$ concentration was 0.25 mol $dm^{-3}$ and in Example 24 it was 0.33 mol $dm^{-3}$.

In Example 22 the electrolysis was carried out to a conversion of 15.1% and bromine content of about 58 mmol $dm^{-3}$. At this point the cumulative current efficiency was about 83–85%. In Example 23 the conversion was 18%, the bromine content about 48 mmol $dm^{-3}$, and the cumulative current efficiency about 79%, while in Example 24 the conversion was 12.3%, the bromine content about 24 mmol $dm^{-3}$, and the cumulative current efficiency about 84%.

EXAMPLE 25

A black sand concentrate (100 g) containing 6 kg/tonne Au was contacted in an agitation bottle with a bromine leaching solution (8.0 g) having a composition typical of a solution that may be prepared from the electrolysis of a sodium bromide solution as described hereinabove. The leaching solution had a pH of about 2 and contained about 0.68% by weight equivalent molecular bromine, about 0.43% by weight bromide ion, and about 0.43% by weight sodium ion. The resultant leaching slurry was agitated in the capped bottle using an overhead mixer at slurry temperature of about 22° C. for 24 hours. During leaching the pH and oxidation-reduction potential (ORP) of the slurry were monitored but no adjustment was made while the run was in progress. Measurements indicated that the pH of the slurry was about 1.7 and the oxidation-reduction potential of the system was initially about 900 mV, falling off to about 800 mV. To establish the kinetics of extraction, samples were withdrawn from the leaching bottle at 2, 4, 6, 12, 18, and 24 hours. Fresh water was added to the bottle to compensate for the sampling loss.

At the end of the run, the leaching slurry was filtered and the cake was repulped for 10 minutes in a volume of water equal to twice the solids weight. The repulped slurry was then filtered and the cake was washed with a volume of water equal to the solids weight. The gold values in the leaching samples, filtrate, wash, and residue were determined by inductively coupled plasma spectrometry (ICP) and fire assay. The results indicated that 90% of the gold was dissolved during the first two hours, and that dissolution reached a maximum in about 4 hours. To optimize gold recovery, the residue ("tails") was releached twice with fresh leaching solution under conditions comparable to the initial leaching operation. Fresh leaching solution restores the ORP to the 800–900 mV range in which effective removal of gold from the source is realized.

To maintain a recovery of 95% of the gold, a total of 14.0 g of leaching solution was consumed, 8.0 g in the initial leach and a total of 6.0 g in the two stage leaching of the residue.

DOWEX-21K ion exchange resin was used for recovery of gold from the leaching solution. In the ion exchanger operation, leaching solution (100 mL) containing 300 mg/L Au and having a pH of 2–3 was mixed with particulate ion exchange resin (1.0 g). Loadings of 125–150 kg/tonne were realized after about 4 hours of contact. In certain runs, gold was eluted from the loaded resin using an acetone/HCl solution prepared from three volumes of acetone and one volume of 1M HCl. In other runs, gold was eluted using a thiourea/HCl solution prepared from equal volumes of 1M thiourea and 1M HCl. After each elution, the resin was regenerated by contacting it for two hours with 1M HCl solution.

EXAMPLE 26

Electrowinning of gold was carried out in the cathode compartment of a divided electrolytic cell. A simulated pregnant gold bromide solution (146.6 ppm Au) (12 dm$^3$) containing 5% Br$^-$ ion and residual Br$_2$ (not determined) was the catholyte, and a 5% H$_2$SO$_4$ solution served as the anolyte. The streams were recirculated (140 dm$^3$hr$^{-1}$) through a plate and frame-type cell equipped with a cation exchange membrane. Nickel foams (30 pores per inch) served as the cathode, and anodized lead shot (PbO$_2$) was the anode. A cell current of 5A (Cell voltage =4.1 V) was imposed for 1.5 hours. This was reduced to 2A for an additional 2.3 hours (Cell voltage =2.9 V). On termination, 0.51 ppm Au was determined in the catholyte which indicates a 99.7% recovery of the gold which plates on the nickel surface.

At the cathode, three electrode reactions take place:

$$AuBr_4^- + 3e^- \rightarrow Au + 4Br^-$$

$$Br_2 + 2e^- \rightarrow 2Br^-$$

$$2H_2O + 2e^- \rightarrow H_2 + 2OH^-$$

At the anode in this example, the counter reaction is the oxidation of water to oxygen. However, it should be recognized that anodic oxidation of Br$^-$ to Br$_2$ at, for example, graphite anodes, could also have been the reaction of choice.

EXAMPLE 27

Four units of a plate and frame-type cell were used to process a 5% HBr solution. Particulate graphite anodes were separated from Pb cathodes by a cation exchange membrane. A 10% sulfuric acid solution was the catholyte. Flow rates of 300 and 260 dm$^3$hr$^{-1}$ were established for the anolyte and catholyte, respectively so that there was no differential fluid pressure across the membrane. A cell voltage of 14.3 V was imposed across bipolar electrical connectors to force a cell current of 10A (individual cell voltage =3.75 V). A Faradaic current efficiency of 96.5% was measured at 9.8% Br$^-$ conversion.

In view of the above, it will be seen that the several objects of the invention are achieved and other advantageous results attained. As various changes could be made in the above products and methods without departing from the scope of the invention, it is intended that all matter contained in the above description shall be interpreted as illustrative and not in a limiting sense.

What is claimed is:

1. A process for producing an aqueous leachate containing a precious metal selected from the group consisting of gold, silver, platinum, palladium or mixtures thereof from a source thereof comprising contacting said source with an aqueous bromine leaching solution, said leaching solution containing between about 0.01% and about 20% by weight equivalent molecular bromine, between about 0.005% and about 20% by weight bromide ion, and between about 0.005% and about 30% by weight total halide ion, thereby producing said aqueous leachate containing the precious metal.

2. A process as set forth in claim 1 wherein said contacting occurs at a pH of less than about 4.

3. A process as set forth in claim 2 wherein said contacting occurs at a pit of less than about 1.

4. A process as set forth in claim 3 wherein said contacting occurs at a pH of less than about 0.

5. A process as set forth in claim 4 wherein said leaching solution contains between about 0.5 and about 5.0 equivalents per liter of acid.

6. A process as set forth in claim 1 wherein said leaching solution contains between about 5% and about 40% by weight H$_2$SO$_4$.

7. A process as set forth in claim 6 wherein said leaching solution between about 10% and about 20% by weight sulfuric acid.

8. A process as set forth in claim 7 wherein said leaching solution contains between about 15% and about 30% by weight HBr, between about 10% and about 25% by weight total bromide ion and between about 20% and about 40% by weight total halide ion.

9. A process as set forth in claim 2 wherein said leaching solution contains an acid selected from the group consisting of HBr, and HCl.

10. A process as set forth in claim 1 wherein said contacting occurs at a temperature of between about 50° C. and about 120° C.

11. A process as set forth in claim 10 wherein said contacting occurs at a temperature of between about 60° C. and about 90° C.

12. A process as set forth in claim 11 further comprising the step of recovering the precious metal from the leachate.

13. A process as set forth in claim 1 wherein said leaching solution contains between about 0.005 and about 10% by weight bromide ion, between about 0.01 and about 1% by weight equivalent molecular bromine, and between about 0.005% and about 15% by weight total halide ion, and has a pH less than about 0.

14. A process as set forth in claim 13 wherein said leaching solution contains between about 0.01 and about 1% by weight bromide ion, between about 0.02 and about 0.5% by weight equivalent molecular bromine, between about 0.01% and about 1.5% by weight total halide ion, and between about 0.5 and about 5.0 equivalents per liter sulfuric acid.

15. A process as set forth in claim 1 wherein said leaching solution contains between about 8 and about 25 gpl equivalent molecular bromine, between about 5 and about 20 gpl bromide ions, and between about 10 and about 40 gpl total halide ions.

16. A process as set forth in claim 1 wherein said aqueous bromine leaching solution is prepared by dilution of a precursor composition initially having a pH of no more than about 8.0 and having an equivalent molecular bromine content of between about 10% and about 40% by weight.

17. A process as set forth in claim 16 wherein said precursor composition has a pH of less than about 4.

18. A process as set forth in claim 17 wherein said leaching solution contains between about 0.5 and about 5.0 equivalents per liter of acid.

19. A process as set forth in claim 18 wherein said leaching solution comprises between about 5% and about 40% by weight $H_2SO_4$.

20. A process as set forth in claim 16 wherein said contacting occurs at a temperature between about 60° C. and about 90° C.

21. A process as set forth in claim 16 further comprising the step of recovering the precious metal from the leachate.

22. A process as set forth in claim 1 wherein said aqueous leaching solution is prepared by acidification and dilution of a precursor composition initially having a pH of no more than about 8.0 and comprising bromide ion, perbromide ion, molecular bromine, at least about 2% by weight bromate ion, and a metal ion selected from the group consisting of alkali metal and alkaline earth metal, the precursor composition having an equivalent molecular bromine content of between about 10% and about 40% by weight and the ratio of the molar concentration of bromate ion to the sum of the molar concentrations of molecular bromine and perbromide ion in the precursor composition being between about 0.05% and about 0.8, the process further comprising the step of recovering the precious metal from the leachate.

23. A process as set forth in claim 22 wherein said contacting occurs at a pH of less than about 4.

24. A process as set forth in claim 23 wherein said leaching solution contains between about 0.5 and about 5.0 equivalents per liter of acid.

25. A process as set forth in claim 24 wherein said leaching solution additionally comprises between about 5% and about 40% by weight $H_2SO_4$.

26. A process as set forth in claim 1 wherein said aqueous leaching solution is prepared by dilution of a composition comprising water, at least about 25% by weight bromine, between about 4% and about 30% by weight hydrobromic acid, and between about 4% and about 15% by weight of a metal bromide selected from the group consisting of lithium bromide, sodium bromide, potassium bromide and calcium bromide, said composition comprising a molar excess of bromide ion over bromine of at least about 30%, said composition having a pH of not greater than about 1.

27. A leaching solution adapted for leaching a precious metal selected from the group consisting of gold, silver, platinum, palladium or mixtures thereof from a source containing said precious metal, said leaching solution having a pH of between about 2 and about 10 and containing between about 0.01% and about 1% by weight equivalent molecular bromine, between about 0.01% and about 1% by weight bromide ion, and between about 0.005% and about 15% by weight total halide ion.

28. A leaching solution as set forth in claim 27 having a pH less than about 0.

29. A composition as set forth in claim 28 wherein said composition contains between about 0.01 and about 1% by weight bromide ion, between about 0.02 and about 0.5% by weight equivalent molecular bromine between about 0.01% and about 1.5% by weight total halide ion, and between about 0.5 and about 5.0 equivalents per liter sulfuric acid.

30. A composition as set forth in claim 27 wherein said composition contains between about 8 and about 25 gpl equivalent molecular bromine.

31. An aqueous composition comprising bromide ion, perbromide ion, molecular bromine, at least about 2% by weight bromate ion, and a metal ion selected from the group consisting of alkali metal and alkaline earth metal, the equivalent molecular bromine content of the composition being between about 10% and about 40% by weight and the ratio of the molar concentration of bromate ion to the sum of the molar concentrations of molecular bromine and perbromide ion in the composition being between about 0.05 and about 0.8.

32. An aqueous composition as set forth in claim 31 having a pH of between about 6.5 and about 7.5.

33. An aqueous composition as set forth in claim 32 containing between about 2% and about 6% by weight bromate ion and between about 55% and about 10% by weight equivalent perbromide ion.

34. A composition the formulation of which comprises water, at least about 25% by weight bromine, between about 4% and about 30% by weight hydrobromic acid, and between about 4% and about 15% by weight of a metal bromide selected from the group consisting of lithium bromide, sodium bromide, potassium bromide and calcium bromide, said formulation comprising a molar excess of bromide ion over bromine of at least about 30%, said composition having a pH of not greater than about 1.0.

35. A process for treating water which comprises introducing into the water a biocidally effective amount of the composition of claim 34.

36. A composition the formulation of which comprises between about 10% and about 40% by weight bromine, between about 4% and about 20% by weight of a metal bromide selected from the group consisting of lithium bromide, sodium bromide, potassium bromide and calcium bromide, between about 5% and about 24% by weight hydrobromic acid, and at least about 10% by weight of an alcohol or a lower organic acid.

37. A composition the formulation of which comprises water, at least about 25% by weight bromine, at least about 4% by weight hydrochloric acid, and between about 10% and about 15% by weight sodium bromide, said formulation comprising a molar excess of halide ion over bromine of at least about 30%, said composition having a weight ratio of water to NaBr of not less than about 4.0 and a pH of not greater than about 1.0.

38. A composition whose formulation comprises water, at least about 25% by weight bromine, at least about 10% by weight hydrobromic acid, and at least about 5% by weight calcium bromide, said formulation comprising a molar excess of bromide ion over bromine of at least about 30%, said composition having a pH of not greater than about 1.0.

39. A composition the formulation of which comprises at least about 15% by weight bromine, between about 15% and about 40% by weight HBr, and between about 40% and about 60% by organic solvent.

40. A composition the formulation of which comprises water, at least about 25% bromine, and between about 30% and about 40% by weight HBr.

41. A process for treating water which comprises introducing into the water a biocidally effective amount of the composition of claim 40.

42. The process of claim 41 and which includes diluting the composition before introducing into the water.

43. A process for producing an aqueous leachate containing a precious metal selected from the group consisting of gold, silver, platinum, palladium or mixtures thereof from a source thereof comprising adding to said source an aqueous bromine leaching solution containing between about 0.01% and about 20% by weight equivalent molecular bromine, between about 0.005% and about 20% by weight bromide ion, and between about 0.005% and about 30% by weight total halid ion, thereby producing said queous leachate containing the precious metal.

* * * * *